United States Patent [19]

Matyas et al.

[11] Patent Number: 5,201,000
[45] Date of Patent: Apr. 6, 1993

[54] METHOD FOR GENERATING PUBLIC AND PRIVATE KEY PAIRS WITHOUT USING A PASSPHRASE

[75] Inventors: Stephen M. Matyas; Donald B. Johnson; An V. Le, all of Manassas; Rostislaw Prymak, Dumfries; John D. Wilkins, Somerville, all of Va.

[73] Assignee: International Business Machines Corporation, Armonk, N.Y.

[21] Appl. No.: 766,533

[22] Filed: Sep. 27, 1991

[51] Int. Cl.$^5$ .............................................. H04K 1/00
[52] U.S. Cl. ........................................ 380/30; 380/46
[58] Field of Search ............................ 380/25, 30, 46

[56] References Cited

U.S. PATENT DOCUMENTS

| | | | |
|---|---|---|---|
| 4,196,310 | 4/1980 | Forman et al. | 380/46 |
| 4,200,770 | 4/1980 | Hellman et al. | 380/30 |
| 4,218,582 | 8/1980 | Hellman et al. | 380/30 |
| 4,405,829 | 9/1983 | Rivest et al. | 380/30 |
| 4,850,017 | 7/1989 | Matyas, Jr. et al. | 380/30 |
| 4,908,861 | 3/1990 | Brachtl et al. | 380/30 |
| 4,918,728 | 4/1990 | Matyas et al. | 380/45 |
| 4,924,514 | 5/1990 | Matyas et al. | 380/49 |
| 4,924,515 | 5/1990 | Matyas et al. | 380/25 |
| 4,941,176 | 7/1990 | Matyas et al. | 380/21 |
| 4,992,783 | 2/1991 | Zdunek et al. | 380/46 |
| 5,073,934 | 12/1991 | Matyas et al. | 380/30 |
| 5,142,578 | 8/1992 | Matyas et al. | 380/30 |
| 5,164,988 | 11/1992 | Matyas et al. | 380/30 |

OTHER PUBLICATIONS

R. W. Jones, "Some Techniques for Handling Encipherment Keys," ICL Technical Journal, Nov. 1982, pp. 175-188.

D. W. Davies & W. L. Price, "Security for Computer Networks," John Wiley & Sons, NY, 1984, Sec. 6.5, Key Management With Tagged Keys, pp. 168-172.

W. Diffie, et al., "Privacy and Authentication: An Introduction to Cryptography," Proc. of IEEE, vol. 67, No. 3, Mar. 1979; pp. 397-427.

Primary Examiner—Salvatore Cangialosi
Attorney, Agent, or Firm—John E. Hoel

[57] ABSTRACT

A data processing system, program and method are disclosed for managing a public key cryptographic system which includes a public key, private key pair generator. The method includes the step of generating a first public key, private key pair using a first seed value known to a user, the first seed value being generated from a passphrase. A first random number is generated using the first seed value and applied to generating the first key pair. The method then generates a first control vector defining a first use of the first public key, private key pair.

The method then continues with the step of generating a second public key, private key pair using a second seed value unknown to the user, the second seed value being a true random number. The second random number is generated using the second seed value in a pseudorandom number generator and applied to generating the second key pair. The method generates a second control vector defining a second use of the second public key, private key pair.

The method then controls the use of the first public key, private key pair using the first control vector and controls the use of the second public key, private key pair with the second control vector.

39 Claims, 9 Drawing Sheets

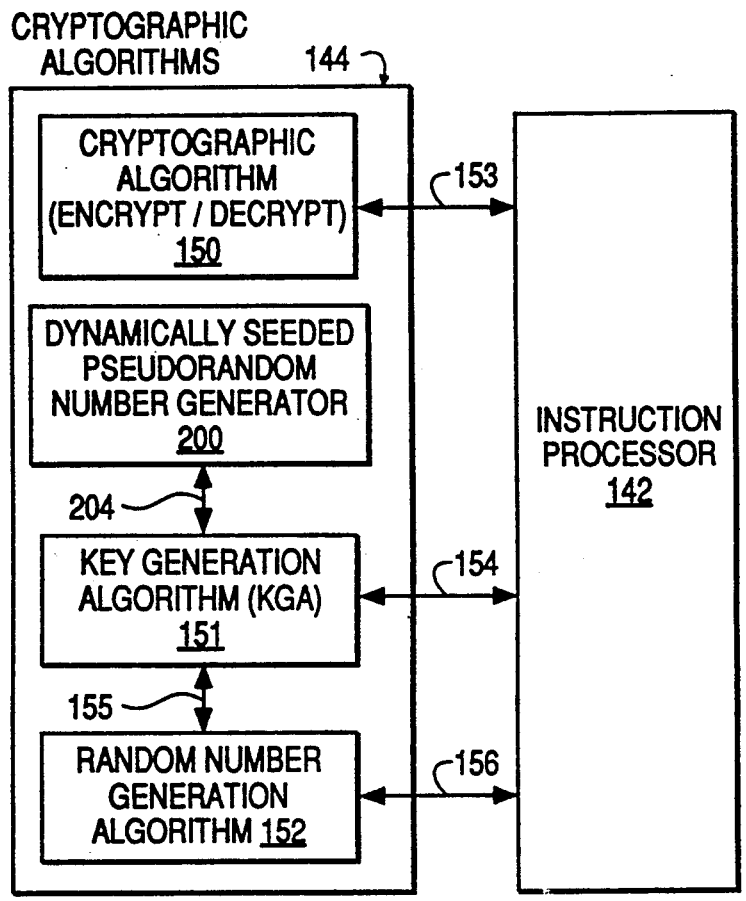

FIG. 11

DYNAMICALLY SEEDED PSEUDORANDOM NUMBER GENERATOR

INPUTS:
    m    : A POSITIVE INTEGER REPRESENTING THE LENGTH
             OF THE TO-BE-GENERATED RANDOM NUMBER IN BITS.
    SEED : A 128-BIT VALUE.

OUTPUTS:
    RN    : A GENERATED RANDOM NUMBER OF LENGTH M BITS.

ALGORITHM SPECIFICATION:
1. SET n := m DIVIDED BY 64.
2. ROUND n UP TO THE NEXT HIGHEST POSITIVE INTEGER.
3. SET K := MOST SIGNIFICANT (LEFTMOST) 64 BITS OF SEED.
4. SET ICV := LEAST SIGNIFICANT (RIGHTMOST) 64 BITS OF SEED.
5. SET A := N BLOCKS OF ZERO BITS.
6. SET Y := THE CIPHERTEXT PRODUCED WHEN A IS ENCRYPTED
         WITH THE DATA ENCRYPTION ALGORITHM USING THE
         CIPHER BLOCK CHAINING MODE OF ENCRYPTION, WHERE
         THE KEY IS K AND THE INITIAL CHAINING VALUE IS ICV.
7. SET RN := MOST SIGNIFICANT (LEFTMOST) m BITS IN Y.

FIG. 12

METHOD FOR GENERATING PUBLIC AND PRIVATE KEY PAIRS WITHOUT USING A PASSPHRASE

BACKGROUND OF THE INVENTION

1. Technical Field

The invention disclosed broadly relates to data processing systems and methods and more particularly relates to cryptographic systems and methods for use in data processing systems to enhance security.

2. Background Art

The following patents and co-pending patent applications are related to this invention and are incorporated herein by reference:

B Brachtl, et al., "Controlled Use of Cryptographic Keys Via Generating Stations Established Control Values," U.S. Pat. No. 4,850,017, issued Jul. 18, 1989, assigned to IBM Corporation and incorporated herein by reference.

S. M. Matyas, et al., "Secure Management of Keys Using Control Vectors," U.S. Pat. No. 4,941,176, issued Jul. 10, 1990, assigned to IBM Corporation and incorporated herein by reference.

S. M. Matyas, et al., "Data Cryptography Operations Using Control Vectors," U.S. Pat. No. 4,918,728, issued Apr. 17, 1990, assigned to IBM Corporation and incorporated herein by reference.

S. M. Matyas, et al., "Personal Identification Number Processing Using Control Vectors," U.S. Pat. No. 4,924,514, issued May 8, 1990, assigned to IBM Corporation and incorporated herein by reference.

S. M. Matyas, et al., "Secure Management of Keys Using Extended Control Vectors," U.S. Pat. No. 4,924,515, issued May 8, 1990, assigned to IBM Corporation and incorporated herein by reference.

S. M. Matyas, et al., "Secure Key Management Using Control Vector Translation," U.S. Pat. No. 4,993,069, issued Feb. 12, 1991, assigned to IBM Corporation and incorporated herein by reference.

S. M. Matyas, et al., "Secure Key Management Using Programmable Control Vector Checking," U.S. Pat. No. 5,007,089, issued Apr. 9, 1991, assigned to IBM Corporation and incorporated herein by reference.

B. Brachtl, et al., "Data Authentication Using Modification Detection Codes Based on a Public One Way Encryption Function," U.S. Pat. No. 4,908,861, issued Mar. 13, 1990, assigned to IBM Corporation and incorporated herein by reference.

D. Abraham, et al., "Smart Card Having External Programming Capability and Method of Making Same," U.S. Ser. No. 004,501, filed Jan. 19, 1987, assigned to IBM Corporation and incorporated herein by reference.

S. M. Matyas, "Technique for Reducing RSA Cryptovariable Storage," U.S. Pat. No. 4,736,423, issued Apr. 5, 1988, assigned to IBM Corporation and incorporated herein by reference.

R. Schulz, "Random Number Generator Circuit," U.S. Pat. No. 4,905,176, issued Feb. 27, 1990, assigned to IBM Corporation and incorporated herein by reference.

S. M. Matyas, et al., "Secure Management of Keys Using Control Vectors with Multi-Path Checking," U.S. Ser. No. 07/596,637, filed Oct. 12, 1990, assigned to IBM Corporation and incorporated herein by reference.

S. M. Matyas, et al., "Secure Cryptographic Operations Using Alternate Modes of Control Vector Enforcement," U.S. Ser. No. 07/574,012, filed Aug. 22, 1990, assigned to IBM Corporation and incorporated herein by reference.

S. M. Matyas, et al., "Method and Apparatus for Controlling the Use of a Public Key, Based on the Level of Import Integrity for the Key," U.S. Ser. No. 07/602,989, filed Oct. 24, 1990, assigned to IBM Corporation and incorporated herein by reference.

S. M. Matyas, et al., "A Hybrid Public Key Algorithm/Data Encryption Algorithm Key Distribution Method Based on Control Vectors," U.S. Ser. No. 07/748,407, filed Aug. 22, 1991, assigned to IBM Corporation and incorporated herein by reference.

S. M. Matyas et al., "Public Key Cryptosystem Key Management Based on Control Vectors," filed on the same day as the instant application, assigned to the IBM Corporation and incorporated herein by reference.

The cryptographic architecture described in the cited patents by S. M. Matyas, et al. is based on associating with a cryptographic key, a control vector which provides the authorization for the uses of the key intended by the originator of the key. The cryptographic architecture described in the cited patents by S. M. Matyas, et al. is based on the Data Encryption Algorithm (DEA), see American National Standard X3.92-1981, Data Encryption Algorithm, American National Standards Institute, New York (Dec. 31, 1981), whereas the present invention is based on both a secret key algorithm, such as the DEA, and a public key algorithm. Various key management functions, data cryptography functions, and other data processing functions are possible using control vectors, in accordance with the invention. A system administrator can exercise flexibility in the implementation of his security policy by selecting appropriate control vectors in accordance with the invention. A cryptographic facility (CF) in the cryptographic architecture is described in the above cited patents by S. M. Matyas, et al. The CF is an instruction processor for a set of cryptographic instructions, implementing encryption methods and key generation methods. A memory in the cryptographic facility stores a set of internal cryptographic variables. Each cryptographic instruction is described in terms of a sequence of processing steps required to transform a set of input parameters to a set of output parameters. A cryptographic facility application program (CFAP) is also described in the referenced patents and patent applications, which defines an invocation method, as a calling sequence, for each cryptographic instruction consisting of an instruction mnemonic and an address with corresponding input and output parameters.

Public key encryption algorithms are described in a paper by W. Diffie and M. E. Hellman entitled "Privacy and Authentication: An Introduction to Cryptography," *Proceedings of the IEEE*, Vol. 67, No. 3, March 1979, pp. 397–427. Public key systems are based on dispensing with the secret key distribution channel, as long as the channel has a sufficient level of integrity. In a public key cryptographic system, two keys are used, one for enciphering and one for deciphering. Public key algorithm systems are designed so that (1) it is easy to generate a random pair of inverse keys PU (for enciphering) and PR (for deciphering) and (2) it is easy to operate with PU and PR, but (3) it is computationally infeasible to compute PR from PU. Each user generates a pair of inverse transforms, PU and PR. The user keeps the deciphering transformation PR secret, and makes the enciphering transformation PU public by placing it in a public directory. Anyone can now encrypt messages and send them to the user, but no one else can decipher messages intended for him. It is possible, and often desirable, to encipher with PU and decipher with PR. For this reason, PU is usually referred to as a public key and PR is usually referred to as a private key. A corollary feature of public key cryptographic systems is the provision of a digital signature which uniquely identifies the sender of a message. If user A wishes to send a signed message M to user B, he operates on it with his private key PR to produce the signed message S. PR was used as A's deciphering key when privacy was desired, but it is now used as his "enciphering" key. When user B receives the message S, he can recover the message M by operating on the ciphertext S with A's public PU. By successfully decrypting A's message, the receiver B has conclusive proof it came from the sender A. Examples of public key cryptography are provided in the following U.S. patents: U.S. Pat. No. 4,218,582 to Hellman, et al., "Public Key Cryptographic Apparatus and Method;" U.S. Pat. No. 4,200,770 to Hellman, et al., "Cryptographic Apparatus and Method;" and U.S. Pat. No. 4,405,829 to Rivest, et al., "Cryptographic Communications System and Method."

In most cryptographic systems, once a cryptographic key has been generated, it may be stored in encrypted form in a cryptographic key data set or it may be transmitted in encrypted form from the generating device to a receiving device where it is re-encrypted in a form suitable for storage and use at the receiving device. Keys are ported from one device to another by writing them on a suitable medium (e.g., diskette, magnetic tape, memory card, smart card) and transporting the medium or by electronically transmitting the keys. However, when the key being transported or transmitted is a secret key, such as a secret key used with a symmetric key cryptographic algorithm (e.g., the Data Encryption Algorithm) or the private key of a public and private key pair used with an asymmetric key cryptographic algorithm, there is an ever present danger that the key may be intercepted by an adversary. One method for securely transporting or transmitting secret or private keys is to encrypt them with a key shared between the sending and receiving devices. However, there are situations where the sending and receiving devices do not share such a key that would facilitate such a secure encryption channel, or where it would be inconvenient or impossible for the sending and receiving devices to establish such a keying relationship in order to facilitate such a secure encryption channel. Therefore, there are times when the only convenient means to port a secret key from one device to another is by porting a clear key.

OBJECTS OF THE INVENTION

It is therefore an object of the invention to provide an improved method for users to port their public and private keys from one cryptographic system to another.

It is another object of the invention to permit users to port their public and private keys from one cryptographic system to another without requiring a separate storage medium, such as a diskette, magnetic tape, memory card, or smart card.

It is another object of the invention to permit a user's public and private keys to be generated and used during periods when the user is actively using a cryptographic device and to permit the keys to be purged from the cryptographic device when the user is not using the cryptographic device.

It is another object of the invention to permit a user's public and private keys to be initialized within a portable computer with a cryptographic capability during periods when the user requires cryptographic services and to purge the keys from the portable computer when cryptographic services are not required.

It is another object of the invention to provide a method whereby a user's public and private key pair can be generated, or re-generated at any cryptographic device within a network of cryptographic devices solely from something that the user remembers, such as a passphrase.

It is another object of the invention to provide a method for constructing passphrases that ensures that the number of passphrase combinations is greater than a number equal to 2 to the power 128, yet the passphrases have enough redundancy within them that users can easily remember them.

It is another object of the invention to provide a method for generating and re-generating public and private key pairs from an input passphrase where the key generation algorithm is based on the Rivest-Shamir-Adelman (RSA) public key cryptographic algorithm.

It is another object of the invention to provide a method for generating and re-generating public and private key pairs from an input passphrase where the key generation algorithm is based on any public key cryptographic algorithm.

It is another object of the invention to provide a key management system that permits the key generation algorithm to produce public and private key pairs of a first type not based on a passphrase and of a second type based on a passphrase.

It is another object of the invention to provide a key management system that permits public and private key pairs of a first type not based on a passphrase to have a first key usage based on a first set of allowed key usages and that permits public and private key pairs of a second type based on a passphrase to have a second key usage based on a second set of allowed key usages.

It is another object of the invention to provide a key management system wherein public and private keys generated from passphrases can be cryptographically separated from public and private keys not generated from passphrases, so that public and private keys generated from passphrases cannot weaken the overall security of a cryptographic system that makes use of both types of generated public and private keys.

SUMMARY OF THE INVENTION

These and other objects, features, and advantages are accomplished by the invention disclosed herein. The present invention provides an alternative means for porting secret or public keys from one device to another device in a network of cryptographic devices. It also provides a means for users of a cryptographic device to purge their secret keys during times when they are not actively using the cryptographic device and to regenerate their secret keys during times when they are actively using the cryptographic device. This is accomplished by initially generating the public and private key pair from a passphrase provided to the key generation algorithm by the user. Thereafter, each time it is necessary to re-generate the same key pair, the user again enters the same passphrase, from which the key generation algorithm derives the same public and private key pair. Such a procedure might be used by a single user who owns a portable programmable computer (PC) possessing a cryptographic capability. During times when the user is traveling, the keys are purged from the system. During times when the user is using the cryptographic system, the keys are re-generated. A passphrase is similar in concept to a password, except that it may be longer, for example, eighty characters or more. As the passphrase may contain more characters, it may contain more variability than a password, yet it is easy for a user to remember a passphrase.

FIG. 1 is a block diagram illustration of a cryptographic system A shared by two users, i and j who generate their public and private key pair when using the device but purge their keys when not using the device. Referring now to FIG. 1, at time t0, a first user, user i, causes his public and private keys PUi and PRi to be re-generated at cryptographic system A by entering his passphrase and invoking a GENERATE KEY function. From time t0 to time t1, user i actively uses his cryptographic keys. At time t1, user i purges his public and private keys PUi and PRi by invoking a PURGE KEY function. At time t2, a second user, user j, causes his public and private keys PUj and PRj to be re-generated at cryptographic system A by entering his passphrase and invoking a GENERATE KEY function. From time t2 to time t3, user j actively uses his cryptographic keys. At time t3, user j purges his public and private keys PUj and PRj by invoking a PURGE KEY function. The PURGE KEY function as described here purges both the public and private keys. In reality, it would be sufficient to purge only the private key.

FIG. 2 is a block diagram illustration of cryptographic systems A and B shared by a single user i who generates his public and private key pair when desiring to use a device and purges his keys when finished using the device. Referring now to FIG. 2, at time t0, user i causes his public and private keys PUi and PRi to be re-generated at cryptographic system A by entering his passphrase and invoking a GENERATE KEY function. From time t0 to time t1, user i actively uses his cryptographic keys. At time t1, user i purges his public and private keys PUi and PRi by invoking a PURGE KEY function. From time t1 to time t2, the user travels from cryptographic system A to cryptographic system B. At time t2, user i causes his public and private keys PUi and PRi to be re-generated at cryptographic system B by entering his passphrase and invoking a GENERATE KEY function. From time t2 to time t3, user i actively uses his cryptographic keys. At time t3, user i purges his public and private keys PUi and PRi by invoking a PURGE KEY function.

The passphrase is composed of words or phrases taken from a natural language, for example, English. Examples [not necessarily good choices) of passphrases are these:

"Time flies like the wind, but fruit flies like bananas."
"Don't worry, what can possibly wrong?" "My father bought my brother a dog because he was an only child."

Since the passphrase contains a meaningful sequence of words, a user is able to remember or recall the passphrase, even when the passphrase contains 80 characters (including blanks) or more. In such situations, the number of passphrase combinations can easily exceed a number equal to 2 to the power 128 (i.e., more than the number of combinations in a double length DEA key). The user is also provided with a set of instructions or guidelines for create passphrases. This ensures that the user will not inadvertently use a passphrase that an adversary might easily guess, e.g., "Mary had a little lamb . . ." While such a passphrase is long, once the first two words are known, the rest follows. The reader will readily appreciate the infeasibility of an adversary guessing a passphrase like this: "Donald Duck, Jack Benny, and Alfred the Great played chess while eating golf balls." During key generation, the passphrase is used as a seed value to generate the necessary random numbers used by the key generation algorithm in the process of generating the keys. No other random numbers are used by the key generation algorithm except those which are generated from the passphrase. Because the generated public and private key pair (PU, PR) are dependent only on the passphrase, (PU,PR) can be re-generated at any cryptographic device within a network of cryptographic devices that implement the same key generation algorithm. This would be the case if the network is composed of cryptographic devices purchased from a single vendor or if the method of key generation is standardized and implemented in several products available from different vendors.

BRIEF DESCRIPTION OF THE DRAWINGS

These and other objects, features, and advantages of the invention will be more fully appreciated with reference to the accompanying figures.

FIG. 11 is a block diagram of the cryptographic algorithms 144 component of the cryptographic facility 30, which has been modified to include a dynamically seeded pseudorandom number generator 200, in accordance with the invention.

FIG. 12 is a block diagram illustration of a specific example of a dynamically seeded pseudorandom number generator.

DISCUSSION OF THE PREFERRED EMBODIMENT

Figure 1:
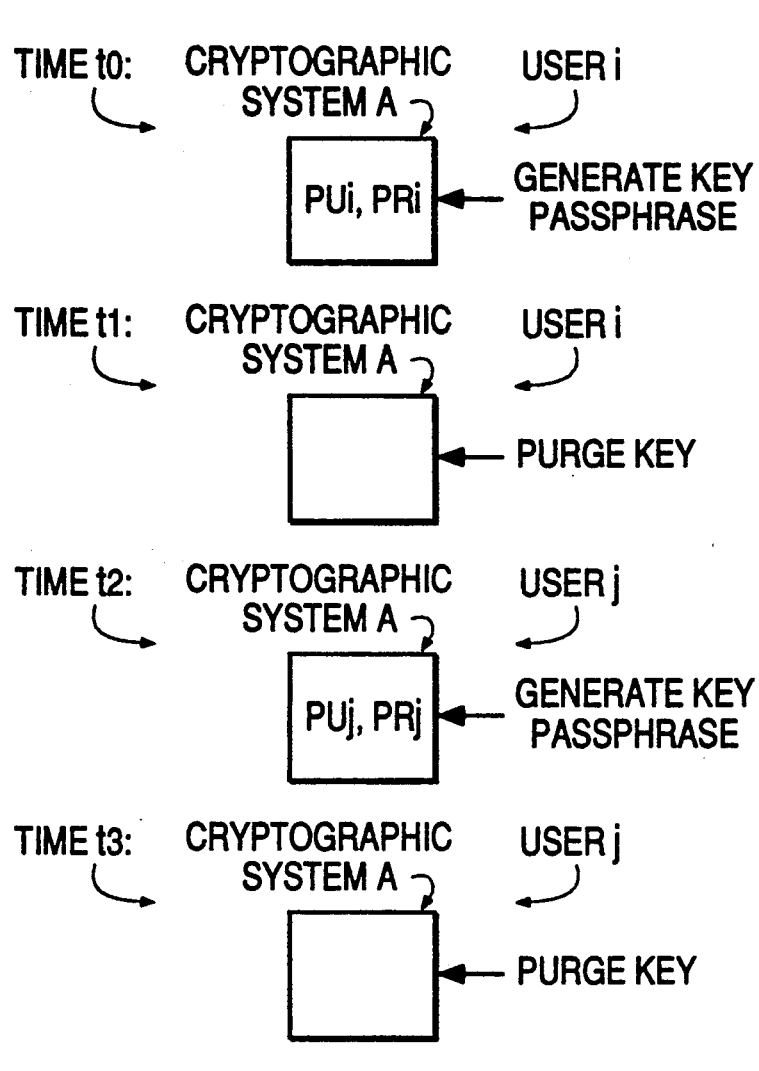
FIG. 1 is a block diagram illustration of public and private key pair generation from a passphrase in cryptographic system A shared by users i and j.

The concept of generating a key from a character string supplied by a user of a cryptographic system has been implemented within IBM's Information Protection System (IPS), see Information Protection System Cryptographic Programs for VM/CMS Users Guide, Order No. SH20-2621, IBM Corporation, August 1982. The Information Protection System is a file protection system designed around the concept that keys used to encrypt or decrypt a data files are controlled and managed by users of the cryptographic system. There are no system-owned keys. At the time data encryption or decryption services are required, the user must specify the key to the cryptographic system. The user may specify either a 16 hexadecimal digit key or a character string of up to 80 characters. When a character string is entered, the IPS "crunches" (i.e., hashes) the input character string into a 56-bit key using the following method. The input character string is padded on the right with blanks to a length of 80 characters. The input character string is then divided into blocks of eight characters. The resulting padded data is then encrypted with the DEA using Cipher Block Chaining (CBC) mode of encryption using a constant key whose value is X'0101010101010101' and an Initial Chaining Value whose value is X'0000000000000000'. The rightmost 56 bits of the final 64-bit block of ciphertext is taken as the "crunched" data key (without parity bits).

The method for producing a data key from a character string in the Information Protection System does not extend to the production of public and private key pairs. This is so because the public key generation algorithm is more complex. In order to generate the public and private key pair from a passphrase supplied by a user, the key generation algorithm itself must be modified and a dynamically seeded pseudorandom number generator must be used. A dynamically seeded pseudorandom number generator is an algorithmic procedure which generates a random number from a seed value specified as an input to the generator. Such pseudorandom number generators are not suitable for the production of most random numbers within a cryptographic system, since the invoker of the random number generator does not, or often will not, have a seed value in hand that can be specified as an input. Thus, in practice, there is no convenient way to use a dynamically seeded pseudorandom number generator within most cryptographic systems. Instead, these cryptographic systems will use an initially seeded pseudorandom number generator or special hardware that can generate true random numbers. Consequently, where it is deemed advantageous to practice the method of the present invention, it will be necessary for a cryptographic system to implement two random number generators: (1) an initially seeded pseudorandom number generator or a hardware generator of true random numbers, and (2) a dynamically seeded pseudorandom number generator. Moreover, it will be necessary to adopt a design for the key generation algorithm that permits public and private keys to be generated by making use of a dynamically seeded pseudorandom number generator. These aspects of the present invention will be more fully explained below.

U.S. Pat. No. 4,736,423 "Technique for Reducing RSA Crypto Variable Storage", cited above, describes a method for calculating a nonsecret value y of 50 bits from a secret value x of 56 bits, which can be used at any later time to re-generate public and private keys having a 400-bit modulus and a 400-bit exponent. For larger exponent and modulus lengths, the length of y increases only slightly while x remains constant at 56 bits. The secret value x is provided as an input to the key generation algorithm, which in addition to calculating public and private keys PU and PR, it also calculates the 50-bit value y. The value y is special in the sense that together with x it permits the public and private RSA keys PU and PR to be re-generated very quickly, relative to the time it originally took to generate PU and PR. The technique is a compromise between storing PU and PR (i.e., the full exponents and modulus), on the one hand, and re-generating PU and PR each time they are needed, on the other hand. The technique in U.S. Pat. No. 4,736,423 reduces the number of bits that must be stored at the expense of requiring a short computation step to re-generate the keys. In the present invention, the public and private keys are generated entirely from a passphrase that the user must remember. In contrast, the method in U.S. Pat. No. 4,736,423 while making use of an independent variable x of 56 bits, which could in theory be obtained by hashing an input passphrase, the value y is a dependent variable of 50 bits. This means that to port the public and private keys, the user must port the dependent variable y and enter it together with independent variable x in order for the cryptographic system to re-generate the public and private key pair. While the method in U.S. Pat. No. 4,736,423 has some of the advantages of the present invention, the present invention makes possible the transportation of the keys from one device to another independent of any additional information other than the passphrase. Therefore, the present invention permits a form of key porting that is unobtainable with the method in U.S. Pat. No. 4,736,423.

Figure 3:
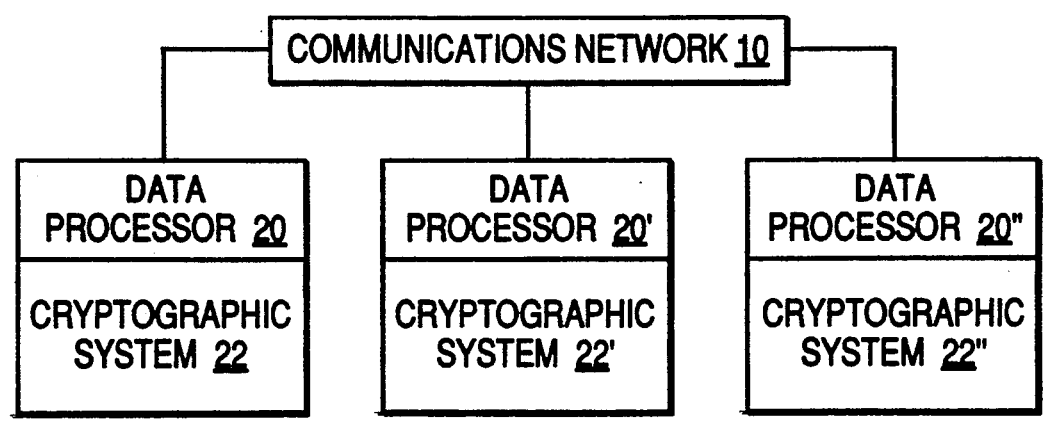
FIG. 3 illustrates a communications network 10 including a plurality of data processors, each of which includes a cryptographic system.

Environment Description for the Invention Disclosed. FIG. 3 illustrates a network block diagram showing a communications network 10 to which is connected a plurality of data processors including data processor 20, data processor 20', and data processor 20". Also included in each data processor is a cryptographic system, as shown in FIG. 3. Data processor 20 includes cryptographic system 22, data processor 20' includes cryptographic system 22' and data processor 20" includes cryptographic system 22". Each data processor supports the processing of one or more applications which require access to cryptographic services such as for the encryption, decryption and authenticating of application data and the generation and installation of cryptographic keys. The cryptographic services are provided by a secure cryptographic facility in each cryptographic system. The network provides the means for the data processors to send and receive encrypted data and keys. Various protocols, that is, formats and procedural rules, govern the exchange of cryptographic quantities between communicating data processors in order to ensure the interoperability between them.

Figure 4:
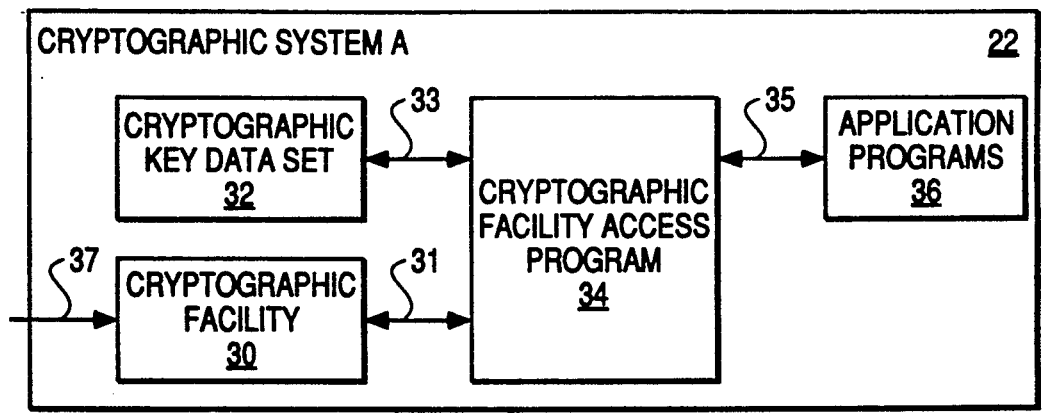
FIG. 4 is a block diagram of a cryptographic system 22.

FIG. 4 illustrates the cryptographic system 22 for the invention disclosed herein. In the cryptographic system 22, the cryptographic facility (CF) 30 has an input 37 from a physical interface. The cryptographic facility access program (CFAP) 34 is coupled to the cryptographic facility 30 by means of the interface 31. The cryptographic key data set (CKDS) 32 is connected to the cryptographic facility access program 34 by means of the interface 33. The application programs (APPL) 36 are connected to the cryptographic facility access program 34 by means of the interface 35.

A typical request for cryptographic service is initiated by APPL 36 via a function call to the CFAP 34 at the interface 35. The service request includes key and data parameters, as well as key identifiers which the CFAP 34 uses to access encrypted keys from the CKDS 32 at the interface 33. The CFAP 34 processes the service request by issuing one or more cryptographic access instructions to the CF 30 at the interface 31. The CF 30 may also have an optional physical interface 37 for direct entry of cryptographic variables into the CF 30. Each cryptographic access instruction invoked at the interface 31 has a set of input parameters processed by the CF 30 to produce a set of output parameters returned by the CF 30 to the CFAP 34. In turn, the CFAP 34 may return output parameters to the APPL 36. The CFAP 34 may also use the output parameters and input parameters to subsequently invoke instructions. If the output parameters contain encrypted keys, then the CFAP 34, in many cases, may store these encrypted keys in the CKDS 32.

Figure 5:
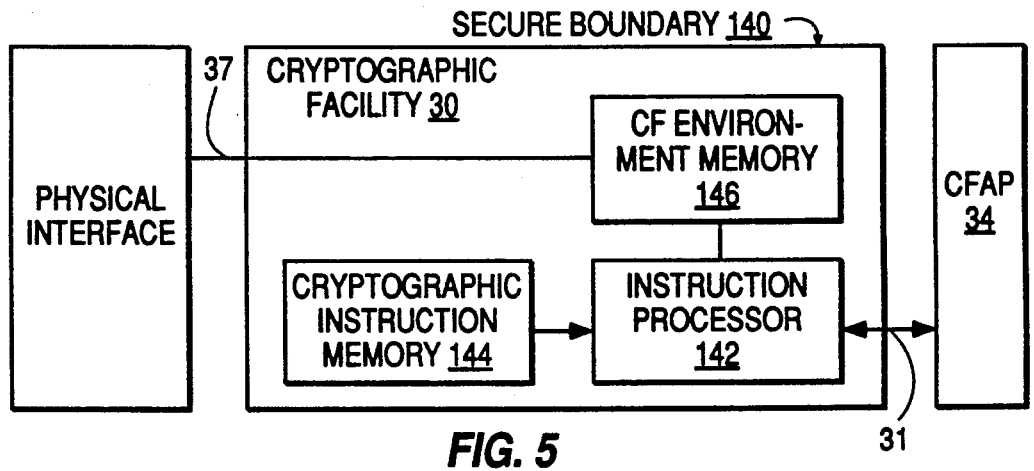
FIG. 5 is a block diagram of a cryptographic facility 30.

FIG. 5 illustrates the cryptographic facility 30 for the invention disclosed herein. The cryptographic facility 30 is maintained within a secure boundary 140. The cryptographic facility 30 includes the instruction processor 142 which is coupled to the cryptographic algorithms 144 which are embodied as executable code. The cryptographic facility environment memory 146 is coupled to the instruction processor 142. The physical interface can be coupled over line 37 to the CF environment memory 146, as shown in the figure. The instruction processor 142 is coupled to the cryptographic facility access program (CFAP) 34 by means of the interface at 31.

The instruction processor 142 is a functional element which executes cryptographic microinstructions invoked by the CFAP access instruction at the interface 31. For each access instruction, the interface 31 first defines an instruction mnemonic or operation code used to select particular microinstructions for execution. Secondly a set of input parameters is passed from the CFAP 34 to the CF 30. Thirdly, a set of output parameters is returned by the CF 30 to the CFAP 34. The instruction processor 142 executes the selected instruction by performing an instruction specific sequence of cryptographic processing steps embodied as microinstructions stored in cryptographic microinstruction memory 144. The control flow and subsequent output of the cryptographic processing steps depend on the values of the input parameters and the contents of the CF environment memory 146. The CF environment memory 146 consists of a set of cryptographic variables, for example keys, flags, counters, CF configuration data, etc., which are collectively stored within the CF 30. The CF environment variables in memory 146 are initialized via the interface 31, that is by execution of certain CF microinstructions which read input parameters and load them into the CF environment memory 146. Alternately, initialization can be done via an optional physical interface which permits cryptographic variables to be loaded directly into the CF environment memory 146, for example via an attached key entry device.

The physical embodiment of the cryptographic facility secure boundary 140, incorporates the following physical security features. The physical embodiment resists probing by an insider adversary who has limited access to the cryptographic facility 30. The term "limited" is measured in minutes or hours as opposed to days or weeks. The adversary is constrained to a probing attack at the customer's site using limited electronic devices as opposed to a laboratory attack launched at a site under the control of the adversary using sophisticated electronic and mechanical equipment. The physical embodiment also detects attempts at physical probing or intruding, through the use of a variety of electromechanical sensing devices. Also, the physical embodiment of the cryptographic facility 30 provides for the zeroization of all internally stored secret cryptographic variables. Such zeroization is done automatically whenever an attempted probing or intrusion has been detected. The physical embodiment also provides a manual facility for a zeroization of internally stored secret cryptographic variables. Reference to the Abraham, et al. patent application cited above, will give an example of how such physical security features can be implemented.

Figure 6:
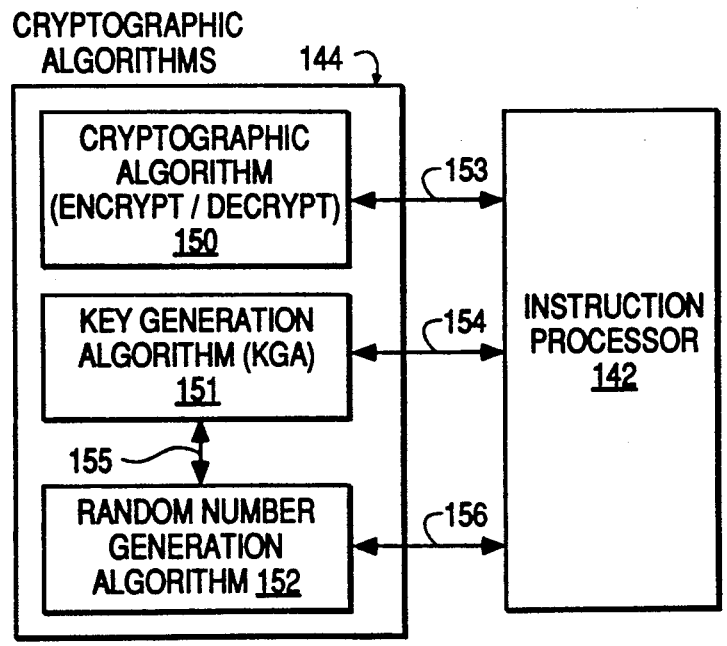
FIG. 6 is a block diagram of the cryptographic algorithms 144 component of cryptographic facility 30.

Key Generation Process: FIG. 6 is a block diagram illustration of the Cryptographic Algorithms 144 contained in the cryptographic facility 30 for the invention disclosed herein. Referring to FIG. 6, the cryptographic algorithms 144 includes a cryptographic algorithm 150 that performs the operations of encryption and decryption, a key generation algorithm (KGA) 151 for the production of keys, and a random number generation algorithm 152 for the production of random numbers. For the present, we shall make no distinction between random and pseudorandom numbers, i.e., random number generation algorithm 152 may be a true random number generator or an algorithm that produces pseudorandom numbers. Random number generators and pseudorandom number generators are discussed below. Cryptographic algorithm 150 may be a symmetric algorithm such as the Data Encryption Algorithm (see American National Standard X3.92-1981, Data Encryption Algorithm, American National Standards Institute, New York (Dec. 31, 1981)), or it may be an asymmetric, or public key, algorithm such as the RSA algorithm. For public key algorithms, there may or may not be a distinction between the mathematical operations of encryption and decryption. For example, in the RSA algorithm both encryption and decryption are performed as exponentiation modulo a composite number. Cryptographic algorithm 150 is accessed by instruction processor 142 via interface 153, which permits instruction processor 142 to perform elementary operations of encryption and decryption. Interface 153 also permits keys, data, and other cryptographic variables to be passed between cryptographic algorithm 150 and instruction processor 142. In like manner, key generation algorithm 151 is accessed by instruction processor 142 via interface 154, which permits instruction processor 142 to request the production of keys. Interface 154 also permits keys, data, and other cryptographic variables to be passed between the two respective components. Key generation algorithm also interfaces to random number generation algorithm 152 via interface 155. This permits the key generation algorithm 151 to request and receive random numbers from random number generation algorithm 152, which are necessary to the key generation process. Random number generation algorithm 152 also interfaces to instruction processor 142 via interface 156, which permits instruction processor 142 to request the production of random numbers that are needed for cryptographic purposes other than for the production of keys.

In the case where cryptographic algorithm 150 is a symmetric or private key cryptographic algorithm such as the DEA, the steps for generating keys with key generation algorithm 151 are simple. In general, the process of generating an n-bit key, say n=64, consists of the following steps. A 64-bit random number RN is requested from random number generation algorithm 152. In some cases, RN may be taken directly as the to-be-generated key. However, in many cryptographic systems, key generation also involves a step of adjusting each byte of the key for odd parity. In still other cases, the key generation algorithm may test the key value to ensure that it does not have some perceived undesired property, e.g., the key is not a "weak" or "semi-weak" key. See Meyer and Matyas, Cryptography—A New Dimension in Computer Data Security, John Wiley & Sons, New York, 1982, for a specification of "weak" and "semi-weak" DEA keys. In most cases, such additional tests are ignored, although it is common practice in many cryptographic systems to adjust the parity of the key.

In the case where cryptographic algorithm 150 is an asymmetric or public key cryptographic algorithm such as the RSA algorithm, the steps for generating keys with key generation algorithm 151 are more involved. In public key cryptographic systems, the public and private key pairs (PU1,PR1), (PU2,PR2), etc. are produced with the aid of a special Key Generation Algorithm (KGA). The KGA involves a combination of processes in which, at times, the KGA produces or requests the production of random numbers which it then uses in the production of the keys. These random values may be tested and rejected, and other random numbers may be requested and tested until certain mathematical properties are satisfied. In still other cases, the KGA may take a random value, or a random value that has been accepted after being tested for some mathematical property or properties, and from this random value it will then derive one or more other values. In general, the KGA requires some random component or components (i.e., random numbers) in the production of the keys. Otherwise, the same public and private key pair would be generated each time the KGA is invoked. This, of course, would be unacceptable—the KGA must produce public and private key pairs (PU1,PR1), (PU2,PR2), etc. that are, or at least appear, randomly drawn from the space of possible key pairs, thus ensuring that an adversary has no means to guess the key pairs produced by the KGA. As said, in addition to making use of random numbers in the production of its keys, the KGA makes use of mathematical processes wherein values are calculated, or derived, from other values (i.e., using a constructive process), and values are calculated using a process of trial and error (i.e., trial values are tested and rejected until the necessary value or values are found). The preferred embodiment is to use the seed value to initialize the pseudorandom number generator rather than using the seed value directly in the key generation algorithm because the pseudorandom number generator can, as needed by the key generation algorithm, generate a pseudorandom number of any arbitrary length, while the seed value, of necessity, is of a specific finite length which implies there is a non-zero probability that the key generation algorithm will need more random bits than are in the seed. If this happens, direct reuse of the seed value would be unacceptable because the key generation algorithm may not then be able to complete its computation, as it may not find any value to output that satisfies all test criteria. Use of the dynamically seeded pseudorandom number generation algorithm avoids this potential infinite cycling problem by ensuring the availability of an arbitrary number of pseudorandom bits.

Figure 7:
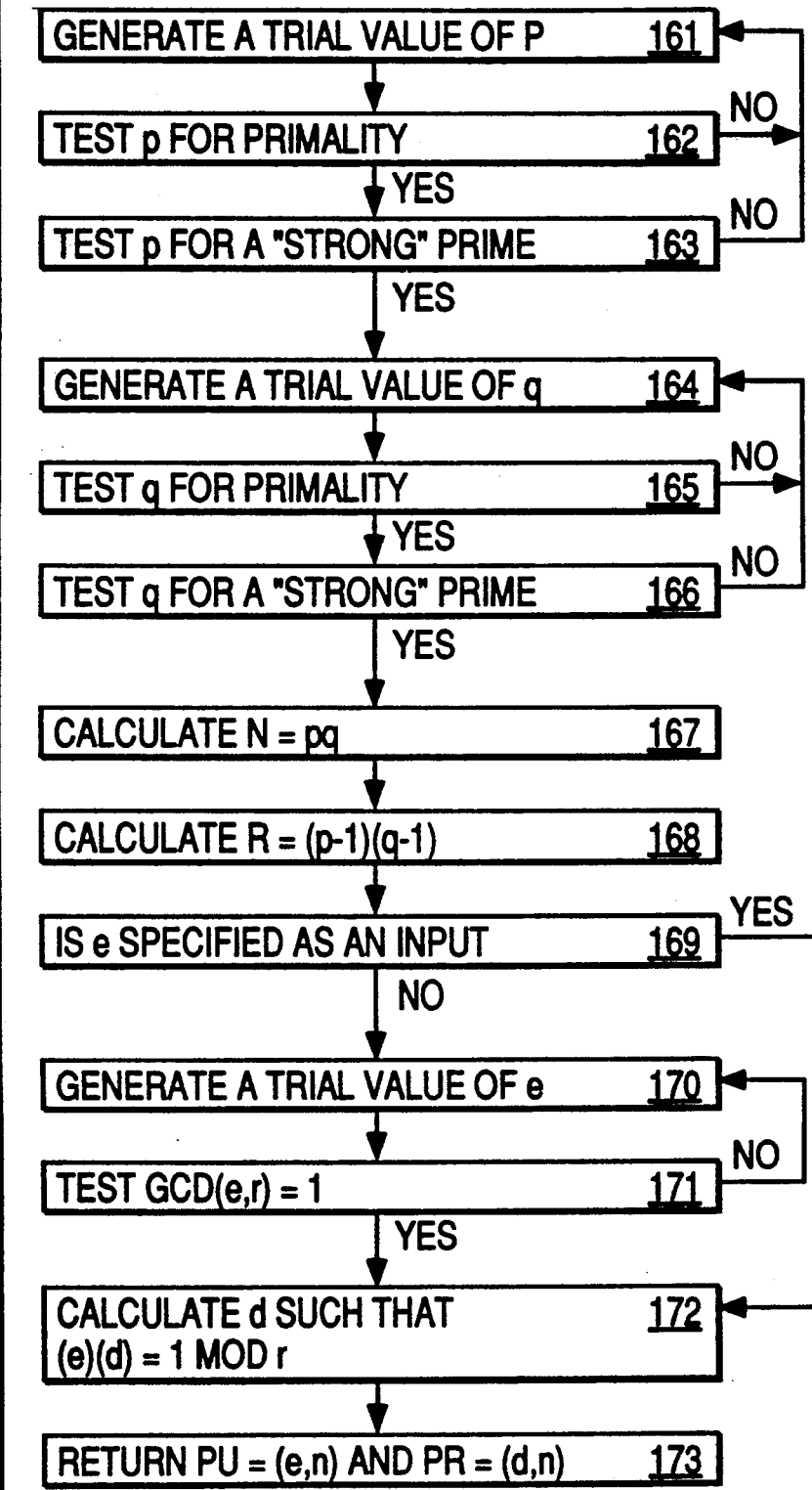
FIG. 7 is a block diagram of the key generation algorithm 151 component of cryptographic facility 30 illustrating the steps involved in generating RSA keys.

FIG. 7 is a flow diagram illustration of key generation algorithm 151 when cryptographic algorithm 150 is the RSA algorithm. Key generation algorithm 151 produces a public and private key pair PU =(e,n) and PR =(d,n), where e and d are called the public and private exponents (e and d are positive integers less than n) and n is the public modulus. Thus, in the 2-tuple (d,n), only the private exponent d needs to be kept secret. Referring now to FIG. 7, at step 161 a trial value of p is generated. At step 162, the value of p is tested for primality. A method for primality testing is described below. If p is prime, control passes to step 163; otherwise control passes back to step 161 (i.e., a new p is generated). At step 163, p is tested to see whether it is a "strong" prime. The term "strong" prime is a term used within the art to denote a prime p that satisfies a set of additional criteria that ensures that the selected value of p does not permit certain mathematical analysis to be performed in order to "break" the cryptographic algorithm by factoring the modulus n into its primes p and q. See Rivest, R. L, Shamir, A., and Adleman, L., "A Method for Obtaining Digital Signatures and Public-Key Cryptosystems," *Communications of the ACM*, 21, No. 2, 120–126, 1978, for a discussion of key generation and extra tests that can be performed on p and q to ensure they are strong enough to thwart cryptographic attacks. The additional tests performed on p at step 163 consist of testing that p−1 has a large prime factor p' and that p'−1 has a large prime factor p". Another test suggested within the literature describing RSA key generation is to test that p+1 has a large prime factor. If p is a "strong" prime, control passes to step 164; otherwise control passes back to step 161 (i.e., a new p is generated). At step 164 a trial value of q is generated. At step 165, the value of q is tested for primality. A method for primality testing is described below. If q is prime, control passes to step 166; otherwise control passes back to step 164 (i.e., a new q is generated). At step 166, q is tested to see whether it is a "strong" prime. The additional tests performed on q at step 166 consist of testing that q−1 has a large prime factor q' and that q'−1 has a large prime factor q". Another test suggested within the literature describing RSA key generation is to test that q+1 has a large prime factor. If q is a "strong" prime, control passes to step 167; otherwise control passes back to step 164 (i.e., a new q is generated). At step 167, the public modulus n is formed as the multiplicative product of p and q. At step 168, the value r is formed as the multiplicative product of (p−1) and (q−1). At step 169, the key generation algorithm determines whether a public exponent e has been supplied as an input. If so, then control passes to step 172, and it is assumed that the supplied value of e satisfies the condition tested at step 171. An alternate embodiment, control could flow to step 171 and the supplied value of e could be checked by key generation algorithm 151. If not, then control passes to step 170. At step 170 a trial value of e is generated. At step 171, e is tested to ensure that it is relatively prime to r. This is easily accomplished to checking that the greatest common divisor (GCD) of e and r is 1, i.e., e and r have no factor in common except 1. If e and r are relatively prime to each other, then control passes to step 172; otherwise, control passes back to step 170 (i.e., a new value of e is generated). At step 172, the value d is calculated so that the product of e and d is congruent to 1 modulo r. At step 173, the calculated values of PU=(e,n) and PR=(d,n) are returned as outputs.

One suitable technique for testing large numbers for primality is to use the efficient "probabilistic" algorithm described by R. Solovay and V. Strassen in their letter entitled "A Fast Monte-Carlo Test for Primality" *SIAM Journal on Computing*, March 1977, pages 84 and 85. It picks a random number "a" from a uniform distribution $(1, 2, \ldots, x-1)$ and tests whether the greatest common divisor of "a" and x is 1, i.e., GCD(a,x)=1, and whether the Jacobi symbol of "a" and x, denoted J(a,x), is congruent to Q modulo x, where Q is equal to "a" raised to the power $(x-1)/2$. The number x can now be tested for primality by using a set of integers (a1, a2, etc.) where each "a" in the set is less than x. Note that the value x is replaced by the values p and q when generating RSA keys, as illustrated in FIG. 7. The test requires that, for each value of "a" in the set, that both conditions stated above hold. Thus, x is found to be a composite number if there is an "a" in the set for which the two conditions do not hold; otherwise x is accepted as prime. The procedure does not guarantee that a selected number is prime, but only that it has not failed the test of primality. The greater the number of integers "a" in the set (a1, a2, etc.), the greater the probability that a selected number is prime—assuming of course that both conditions are satisfied for each of the integers "a" in the set. Methods for calculating the greatest common divisor of two integers, the least common multiple of two integers, and the Jacobi symbol of two integers are well known within the art.

It is well-known to those skilled within the art, that for the RSA algorithm to achieve adequate cryptographic security, it is necessary for the modulus n to be a number somewhere between 512 and 1,024 bits. In the described key generation algorithm, the public key exponent e can either be specified to the key generation algorithm or it can be generated by the key generation algorithm. The advantage in specifying e to the key generation algorithm is that a small value can be specified, say e=3. This gives improved performance when encrypting with the public key. The private exponent d is a dependent variable, and must be derived. Hence, for practical purposes, d will be of the same size as the modulus. Thus, one sees that for a modulus of 512 bits, the public key PU will have from 514 to 1,024 bits, depending on the number of bits in the selected exponent e, whereas the private key PR will have 1,024 bits. When compared to DEA keys which are 64 or 128 bits, the RSA keys are considerably larger. Those skilled in the art will also recognize that key generation with a public key algorithm is a fairly computationally intensive procedure. Thousands and perhaps even millions of DEA keys can be generated in the same time it takes to generate a single public and private key pair. Unlike the DEA which has a fixed block size, the RSA algorithms does not specify a particular block size. This accounts for the fact that RSA key generation may be a relatively short or relatively long process, depending on the selected modulus length. In order for the key generation algorithm 151 to generate public and private keys of a desired size (i.e., with a specified number of bits), steps 161 and 164 are designed so that the generated primes p and q, when multiplied together, will produce a modulus n of desired size, or length in bits. Those skilled in the art will appreciate that additional tests on p and q can be added to the flow diagram in FIG. 7, so that key generation can be tailored according to specifications that may be provided within a cryptographic standard, such as ISO Draft Internal Standard 9796 "Digital Signatures Scheme Giving Message Recovery." Those skilled in the art will also recognize that the RSA key generation algorithm described in FIG. 7 could be made more efficient if p and q are produced with a process that combines trial and error with a method that constructs the values, instead of using only a trial and error process. Instead of generating p, testing that p−1 has a large prime p', and testing that p'−1 has a large prime p", one could start by generating a large prime p". In that case, one finds a prime p' from p" by multiplying p" with a small number, adding one, and then testing for primality. If the resulting p' is not prime, then repeat the process, except multiply p" by a different small number. The valve of p can be found from p' using the same technique. Likewise, q can be found from q" using the same technique.

Those skilled in the art will recognize that many different variations for RSA key generation are possible. However, in all cases, the process of key generation requires random numbers, which may be produced using either a random number generator or a pseudorandom number generator. Referring again to FIG. 7, at steps 161 and 164 the trial values of p and q are randomly generated. Once generated the least significant (low-order or rightmost) bit can be set equal to B'1', thus ensuring that the generated values are always odd integers. This speeds up the process, since except for the value 2, all prime numbers are odd numbers. In the situation where p and q are generated from p" and q", as described above, the trial values of p" and q" are randomly generated. If the public exponent e is not supplied as an input to key generation algorithm 151, then the trial value of e is randomly generated. Thus, one sees that in all cases, RSA key generation requires the production and use of random numbers.

Random and Pseudorandom Numbers: Most cryptographic systems require a means to produce and use random numbers. Random numbers are used as keys or in the production of keys. Random numbers are used as initialization vectors or initial chaining values, e.g., when using the Cipher Block Chaining mode of encryption with the DEA. Random numbers are used as "seed" values, e.g., when using the Cipher Feedback mode of encryption with the DEA. Random numbers are used as nonces in many cryptographic-based identification and authentication protocols. Without a capability to produce random numbers, most cryptographic systems would be severely limited or rendered useless.

Figure 8:
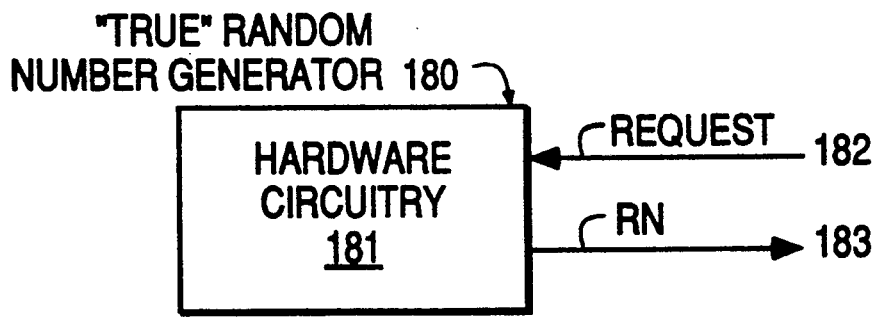
FIG. 8 is a block diagram illustration of a "true" random number generator 180.
Figure 9:
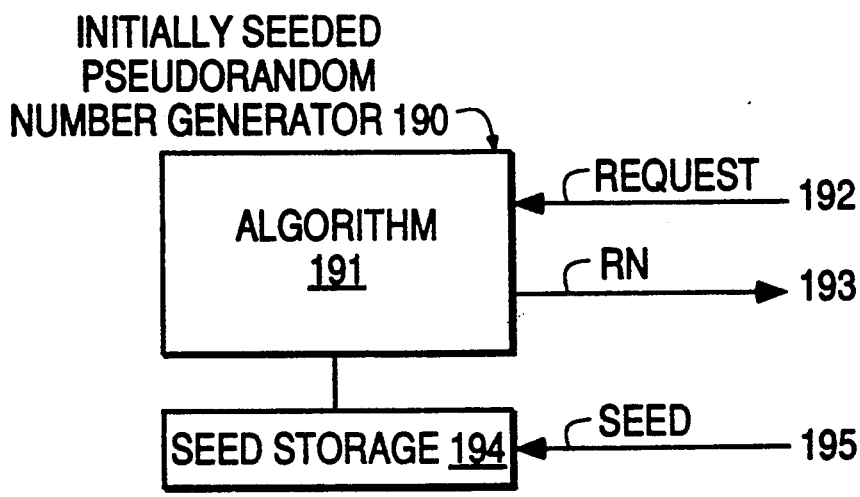
FIG. 9 is a block diagram illustration of an initially seeded pseudorandom number generator 190.

FIGS. 8 and 9 illustrate the two frequently used means to generate random numbers within cryptographic systems. FIG. 8 is a block diagram illustration of a "true" random number generator 180. "True" random number generator 180 contains a hardware circuitry 181, which is capable of producing random numbers. Means for producing random numbers with such hardware generators is well known and practiced within the art (see U.S. Pat. No. 4,905,176 "Random Number Generator Circuit," by R. Schulz, issued Feb. 27, 1990, cited above). Requests for random numbers are input via interface 182. Generated random numbers (RN1, RN2, etc.) are output via interface 183. In practice, the length of the generated random numbers is a fixed constant of the algorithm, e.g., 64 bits. A "true" random number generator has the property that its output values are unpredictable. That is, no algorithm can be constructed that will predict the output of the random number generator. A "true" random number generator requires no seed value to initialize it, and hence there is no way to force the outputs of the generator to repeat. These properties make the "true" random number generator highly desirable for implementation within cryptographic systems. However, the cost of "true" random number generators is relatively high when compared to pseudorandom number generators, and therefore, most commercial cryptographic systems use pseudorandom number generators.

FIG. 9 is a block diagram illustration of an initially seeded pseudorandom number generator 190. Initially seeded pseudorandom number generator 190 contains an algorithm 191 and a seed storage 194 for the storage of a seed value used by algorithm 191 to generate random numbers. (Note that the random numbers produced by a pseudorandom number generator only appear random. More correctly, the output produced by a pseudorandom number generator should be called pseudorandom numbers. But for convenience, we shall call them random numbers.) The initial seed value is specified via interface 195. The initial seed value itself may be input to the cryptographic system via a utility program that interfaces to the cryptographic facility via one of the cryptographic instructions, or it may be input via a special front panel interface that may be activated only by authorized installation personnel using an entered password or a physical key-activated switch. When a pseudorandom number generator is used for generating keys, the initial and all subsequent seed values must be kept secret. Otherwise, since the pseudorandom number generation algorithm is considered to be in the public domain, the secrecy of the generated random numbers depends on keeping the seed values secret. When random numbers are generated, the seed value may be updated dynamically by algorithm 191, depending on the nature of algorithm 191. Algorithm 191 may also contain a separate storage, such as a storage for a counter or sequence number which is automatically updated during the production of random numbers. In this case, the seed value may remain constant and only the counter or sequence number is updated. In cases where a counter or sequence number is used, its initial value is set by the algorithm 191 at the time the seed value is initialized via interface 195 into seed storage 194. Requests for random numbers are entered via interface 192. Generated random numbers (RN1, RN2, etc.) are output via interface 193. In practice, the length of generated random numbers will be some fixed value, e.g., 64 bits. A pseudorandom number generator has the property that its output values are entirely predictable. The output of a pseudorandom number generator is a stream of numbers (RN1, RN2, etc.) which appear random. RN2 differs from RN1 only because the algorithm has a "memory," so to speak. That is, the algorithm updates itself continually, so that each time the algorithm is called it begins from a different "starting" point. However, if each instance of the same algorithm 191 were initialized with the same seed value, then the random numbers produced by each algorithm 191 would be exactly the same. Good cryptographic practice dictates that the initial seed value should itself be selected via a random process. This ensures that each initially seeded pseudorandom number generator 190 in each different cryptographic device will produce different random numbers.

Figure 10:
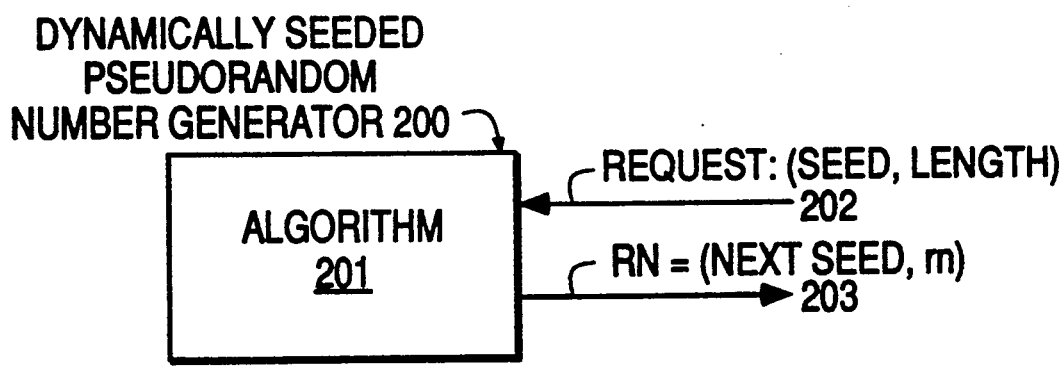
FIG. 10 is a block diagram illustration of a dynamically seeded pseudorandom number generator 200.

FIG. 10 is a block diagram illustration of a dynamically seeded pseudorandom number generator 200. Dynamically seeded pseudorandom number generator 200 contains an algorithm 201 for generating random numbers. Requests for random numbers are entered via interface 202. Generated random number (RN1, RN2, etc.) are output via interface 203. The length of the generated random number, designated RN, at interface 203 is equal to the value specified by the length parameter at interface 202. Algorithm 201 has no internally stored seed value. Instead, the required seed value is specified to algorithm 201 at interface 202. Note that this seed value must be externalized to the invoker, as this allows interleaving of requests by other invokers, while ensuring the same output will result when the same seed is input. For convenience, algorithm 201 also permits a length parameter to be specified at interface 202, where the value of length determines the length of the generated random number. In practice, the length of the seed would most likely be a fixed constant pre-established by algorithm 201. To illustrate the operation of dynamically seeded pseudorandom number generator 200, assume the following: (1) the parameter "length" is specified in bits, (2) the length in bits of the parameter "seed" is 128, and L is the length in bits of the desired random number, which is designated RN. In that case, value specified in parameter "length" is calculated as 128+L, i.e., the length of the next seed plus the length of the desired random number.

In an alternate embodiment, the production of the next seed could be made automatic, and hence parameter "length" would specify the length of the desired random number RN. In that case, there are two outputs at interface 203, next seed and RN.

Either embodiment will work. In the first case, dynamically seeded pseudorandom number generator 200 is unaware of the method for producing next seed. The production and management of the next seed value is under the control of the invoker. In the second case, dynamically seeded pseudorandom number generator 200 is responsible for calculating and returning a next seed value to the invoker.

In another alternate embodiment, the algorithm for the initially seeded pseudorandom number generator and the algorithm for the dynamically seeded pseudorandom number generator could be the same algorithm, and the same circuitry and/or routines for the algorithm could be used. The initially seeded generator would use system storage that is not accessible to a normal user to contain the system seed values, which would be automatically updated as needed when the initially seeded algorithm was invoked, and the dynamically seeded generator would require the invoker to pass (and therefore maintain) the seed values. Those skilled in the art will appreciate that many embodiments with one or more minor modifications and variations from the described methods are possible, and that these differences have no impact on the invention.

The reader will appreciate that in order to practice the subject invention, wherein a public and private key pair (PU,PR) is generated from a secret passphrase supplied as input by the user, it is of critical importance for the key generation algorithm to be able to regenerate the same sequence of random numbers and therefore to re-generate the same key pair (PU,PR) each time the same passphrase is specified to the key generation algorithm. In contrast to this, all other cryptographic applications requiring random numbers within a cryptographic system have no need to re-generate the same sequence of random numbers. In fact it could be argued that such a capability, if present within the cryptographic system, might lead to an unfortunate situation wherein keys are accidentally re-generated.

The reader will also appreciate that it is infeasible to re-generate, and therefore to generate, a public and private key pair (PU,PR) from a passphrase when the random numbers required by the key generation algorithm are produced with the methods shown in FIGS. 8 and 9. The "true" random number generator 180 of FIG. 8 cannot be used, since there is no way to force the generator to re-generate the same sequence of random numbers, which would be necessary in order to satisfactorily re-generate the key pair (PU,PR). In like manner, the initially seeded pseudorandom number generator 190 of FIG. 9 cannot be used, since there is also no way to force the generator to re-generate the same sequence of random numbers. In practice, such pseudorandom number generators are generally initialized just once when the cryptographic system is powered up and brought on line, or sometimes following a period when the device has been powered off. Thereafter, one merely requests random numbers, i.e., there is no provision to re-specify a seed value dynamically. The task of "seeding" the pseudorandom number generator is best accomplished once rather than requiring each caller of the pseudorandom number generator to input his own "seed" value, since in many cases the caller has no such seed value in hand. In fact, it is important from a security perspective that a normal user not be able to specify the seed value for such a pseudorandom number generator as this type of generator is expected to be used by many users of the system.

From the foregoing discussion, it is evident that the dynamically seeded pseudorandom number generator illustrated in FIG. 10 can satisfy the requirements of the present invention, but does not satisfy the general requirement for production of random numbers within most cryptographic systems. Likewise, from the foregoing discussion, it is evident that the "true" random number generator illustrated in FIG. 8 and the initially seeded pseudorandom number generator illustrated in FIG. 9 can satisfy the general requirement for production of random numbers within most cryptographic systems, but do not satisfy the requirement for production of random numbers when the key generation algorithm must re-generate keys from a passphrase. Therefore, in the preferred embodiment of the invention, two means for generating random numbers shall be required, as illustrated in FIG. 11. Referring to FIG. 11, the cryptographic algorithms 144 component of the cryptographic facility, previously depicted in FIG. 6, has been expanded to include a dynamically seeded pseudorandom number generator 200 and interface 204 between key generation algorithm 151 and dynamically seeded pseudorandom number generator 200 permitting requests for random numbers to be made and generated random numbers to be returned. Dynamically seeded pseudorandom number generator 200 in FIG. 11 is assumed to operate the same as dynamically seeded pseudorandom number generator 200 in FIG. 10, already described. That is, a request for a random number also includes the specification of a length and a seed. The output is a random number. The key generation algorithm 151 is assumed to manage the seed values. For example, the first seed is calculated from the passphrase using a method yet to be described. Whenever key generation algorithm 151 requires a random number of length L, it specifies a "length" parameter of L+128, i.e., it automatically requests a next seed which it saves in a next seed storage area accessible to key generation algorithm 151 (e.g., within key generation algorithm 151). In the situation where key generation algorithm 151 of FIG. 11 is just the RSA key generation algorithm 151 of FIG. 7, steps 161, 164, and 170 of FIG. 7 would result in requests for random numbers directed to dynamically seeded pseudorandom number generator 200 at interface 204 of FIG. 11. Thus, each time step 161, 164, or 170 of FIG. 7 is repeated, a new random number is obtained. And since there is no way to know in advance how many trials are needed before finding values that are satisfactory, since the process is one of trial and error, one cannot pre-calculate the sequence of random numbers and use them as required.

FIG. 12 is an example of a dynamically seeded pseudorandom number generator that satisfies the requirements of the present invention. The algorithm requires a 128-bit seed which is divided into a 64-bit key K and a 64-bit initial chaining value ICV. The leftmost 64 bits of seed becomes K and the rightmost 64 bits of seed becomes ICV. If m is the number of random bits to be generated, then let 64n denote the smallest value larger than m. Note that n represents the number of 64-bit blocks of to-be-generated ciphertext which is long enough to produce a pseudorandom sequence of m bits. To generate the ciphertext, we start with n 64-bit blocks of binary zeros, which are encrypted with the DEA algorithm using the Cipher Block Chaining mode of DEA encryption. The key and initial chaining value are just the values K and ICV mentioned above. The output random number RN of length m is just the leftmost (most significant) m bits in the resulting ciphertext.

Figure 13:
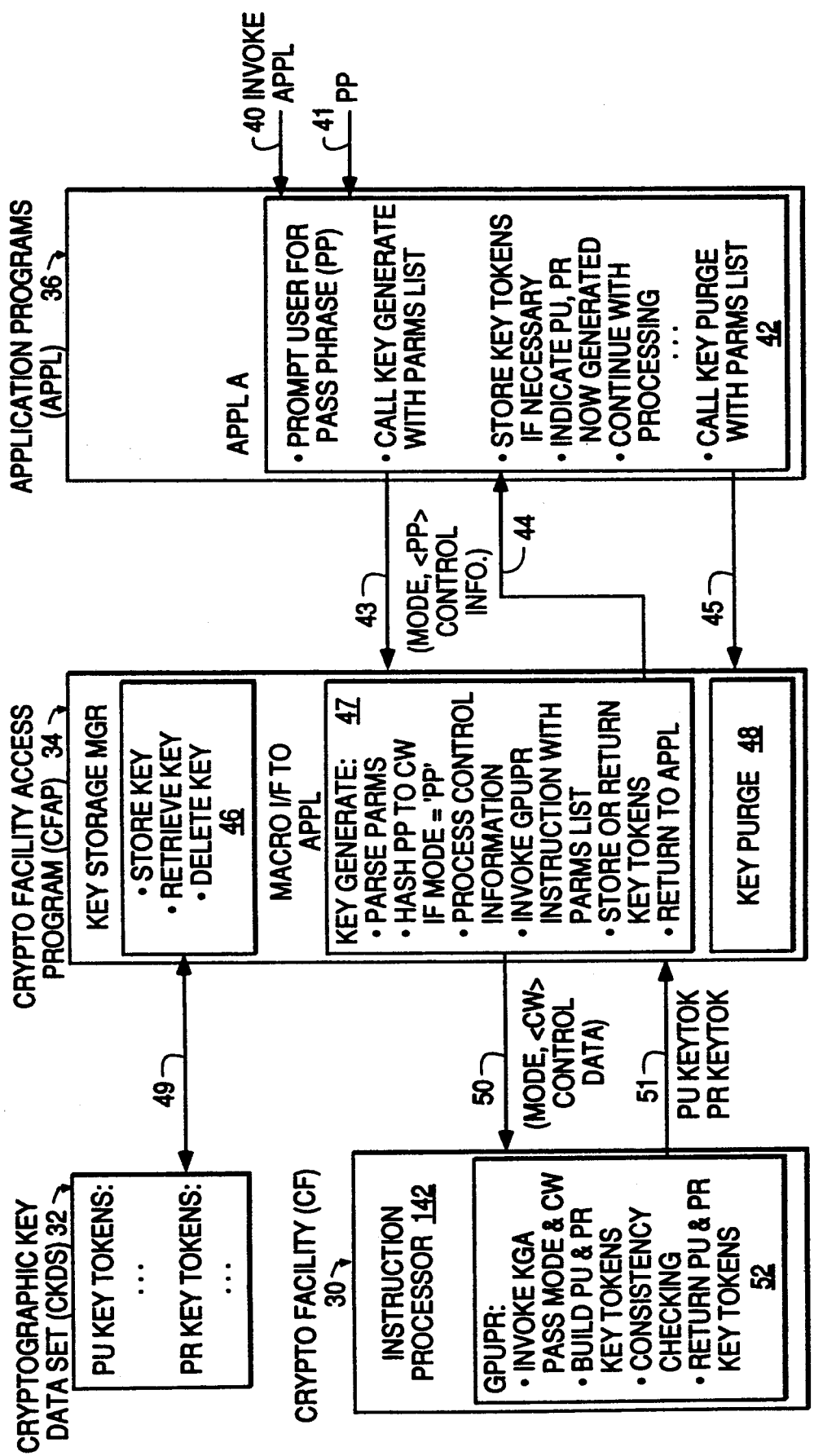
FIG. 13 is a block diagram showing the steps involved in generating a public and private key pair from an input passphrase, in accordance with the invention.

Key Generation Using a Passphrase: FIG. 13 illustrates a cryptographic system comprising a cryptographic facility (CF) 30, a cryptographic key data set (CKDS) 32, a cryptographic facility access program (CFAP) 34, and application programs (APPL) 36. Referring now to FIG. 13, the steps in generating a public and private key pair (PU,PR) can be traced. Application program A (APPL A) 42 is invoked by a user at 40. APPL A is assumed to be (1) an application that requires the user to generate or re-generate his keys before the application can continue with processing, or (2) it is a utility that permits users to generate or re-generate their keys. APPL A prompts the user for his/her passphrase (designated PP), which the user enters at 41. In response, APPL A calls KEY GENERATE function 47, at 43, located in the CFAP 34, passing a mode parameter, PP, and control information (designated control information). The control information may be control vectors or information used to build the control vectors. The mode parameter indicates to the KEY GENERATE function whether the generate keys are to be generated on the basis of a passphrase (mode='PP'), or not (mode='noPP'). The PP parameter is therefore an optional parameter. The control information is key-related information specifying key type (i.e., the type of public and private key pair to be generated) and usage control information indicating how the keys can be used within the key management. In response, KEY GENERATE function 47 (1) parses the input parameters, (2) calculates a 128-bit hash value CW from the input passphrase PP if mode='PP', processes the input control information and builds the control data parameters to be specified to the GPUPR instruction, and (3) invokes the GPUPR instruction 52 executing in instruction processor 142 of cryptographic facility 30 at 50, passing a mode parameter, an optional code word CW, if mode="PP", and control data. The control data consists of a PU control vector specifying key-related information associated with and about the to-be-generated public key PU and a PR control vector specifying key-related information associated with and about the to-be-generated private key PR. Each control vector contains a key name identifying the key within the cryptographic system. Each control vector may also contain a label, or reserved space for a CKDS label to be initialized by the CF, which can be used to store and retrieve the key token from the cryptographic key data set (CKDS) 32. In response, GPUPR instruction 52 invokes the key generation algorithm KGA, more fully described in FIG. 14, passing as inputs a mode parameter, and a code word CW if mode='PP'. In response, the KGA generates and returns the public and private keys PU and PR, to GPUPR instruction 52, more fully described in FIG. 14. In response, the GPUPR instruction 52 builds a PU key token containing the generated PU and a PR key token containing the generated PR. The PU key token and the PR key token are illustrated in FIG. 15, and are more fully discussed below. The GPUPR instruction also performs consistency checking on the mode and the control data passed as input at 50, more fully explained below. The consistency checking ensures that the key type and usage information in the control vector portion of each key token is in agreement with the mode, i.e., whether the keys are generated from a passphrase or not. The PU and PR key tokens are then returned to the KEY GENERATE function 47 at 51. In response, KEY GENERATE function 47 updates the PU and PR key tokens, as necessary, e.g., a reserved field in the token for storage of a CKDS label may be filled in at this time. KEY GENERATE function 47 then causes key storage manager 46 to store one or both key tokens in CKDS 32 and return only a key name or label to APPL A at 44, or it may return one or both key tokens to APPL A at 44. The intent here is to allow APPL 42 to manage and control the key tokens if so desired or to have the cryptographic system manage and control the key tokens. Both approaches have advantages, and it is possible to design the cryptographic system so that the handling of the key tokens, whether they are stored in the CKDS 32 or returned to APPL A 42 is under the control of an input parameter specified by APPL A 42 to KEY GENERATE function 47 at 43. In response, APPL A stores the key tokens, as necessary, or it stores the key names or labels that permit the PU and PR key tokens to be re-specified at a later time as inputs to other cryptographic functions executing in the CFAP. APPL A now indicates to the user that the requested or required public and private keys have been generated from the input passphrase. APPL A continues processing, as necessary, until such time as processing is complete. Assuming now that one or more of the generated key tokens have been stored in CKDS 32, APPL A calls KEY PURGE function 48, at 45, located in the CFAP 34, passing a key name or label for each key token to be purged. In response, KEY PURGE function 48 causes key storage manager 46 to delete each key token from CKDS 32. If APPL A manages the key tokens, then APPL A purges the key tokens instead of calling KEY PURGE function 48. Although not shown in FIG. 13, it is assumed that appropriate return codes and condition codes are made available to each calling entity so that the calling entity has an indication that the requested processing has completed normally or whether an error has occurred requiring some additional action to be taken. Those skilled in the art will recognize that the KEY GENERATE function 47 and the GPUPR instruction 52 are designed to handle two types of key generation, as follows: (1) where PU and PR are generated from a passphrase (mode='PP') and (2) where PU and PR are not generated from a passphrase (mode='noPP'). That is, the design of the KEY GENERATE function and GPUPR instruction is based on what is believed to be a preferred embodiment of the invention, since neither mode permits both kinds of key generation to be accomplished and each mode has its own distinct advantages within the key management as now discussed.

When a public and private key pair (PU,PR) are generated, it is important to distinguish whether these keys have been generated from a passphrase or not. In effect, keys generated from a passphrase are keys known to the user. If not directly known, these keys can be calculated by the user, and therefore in a strict sense are known to the user. This is so because the algorithm used in the calculation of PU and PR are presumed to be in the public domain, i.e., there is nothing about it that is secret. The only secret variable is the passphrase itself. Thus, if one knows the passphrase, one therefore knows the keys (or can calculate them). However, when the public and private key pair (PU,PR) is not generated from a passphrase, i.e., where the random components or values involved in the key generation process are produced within the cryptographic facility using either a true generator of random numbers (FIG. 8) or an initially seeded pseudorandom number generator (FIG. 9), the keys generated by the key generation algorithm are for all practical purposes unknown or not knowable to the user. (In many instances, the keys are encrypted under a master key, and so the generated keys are as secure as the master key. Anyone who knows the master key also knows the generated PU, which we don't worry about since it is a public key, and PR.) In a 'smart' key management design, one can take advantage of both types of generated keys. A private key PR not generated from a passphrase is, in theory, knowable only by the cryptographic system itself. Hence, such a key, if implemented properly, can be used to enforce a system level of integrity or a system level of secrecy, which is not achieved if PR is known to a user. On the other hand, there are many functions well served by a PR that is known to the user, e.g., a PR used to authenticate the user to the cryptographic system, or to authenticate the user to other users, or to authenticate information as coming from that user (e.g., when the user calculates and attaches a digital signature to his message). The key management design may take advantage of these differences in the following way. As part of the processing of GPUPR instruction 52, there is a step in which the PU and PR key tokens are built.

FIG. 15 illustrates the formats of the PU key token and PR key token. Since the PU key is a public key, the PU key token may store PU in the clear or in an encrypted form, eKM.H1(PU), where KM.H1 is the Exclusive OR product of secret master key KM stored within the CF environment memory 146 of the CF 30 and a cryptographic variable H1 produced from control vector C1 for PU by hashing C1 to produce an intermediate hash value hash1 and fixing a few bits in hash1 to produce H1. A precise specification of eKM.H1(PU) can be found in co-pending patent application by S. M. Matyas, et al. entitled "Public Key Cryptosystem Key Management Using Control Vectors," cited above. Since the PR key is a private key, the PR key token stores PR only in an encrypted form, eKM.H2(PR). A precise specification of eKM.H2(PR) can be found in co-pending patent application by S. M. Matyas, et al. entitled "Public Key Cryptosystem Key Management Using Control Vectors," cited above. The cryptovariables H1 and H2 under which PU and PR are encrypted are different. H1 is derived from control vector C1 associated with public key PU and H2 is derived from control vector C2 associated with private key PR. The PU and PR key tokens also contain the control vectors C1 and C2, respectively, which is key-related data such as a key name or a CKDS label, usage control information, etc. The PU and PR key tokens also contain an authenticators of the form eKM.H1'(KAR) and eKM.H2'(KAR), where KAR is a key authenticator record and H1' and H2' are cryptographic variables related to H1 and H2. The KAR is a cryptographic function of the clear or encrypted key, i.e., PU, eKM.C-(PU), or eKM.C(PR). A precise specification of eKM.H1'(KAR) and eKM.H2'(KAR) can also be found in co-pending patent application by S. M. Matyas, et al. entitled "Public Key Cryptosystem Key Management Using Control Vectors," cited above. The PU and PR key tokens also contain a header portion with information identifying the location and lengths of the other fields in the key tokens. This permits the fields to be variable length.

Figure 15:
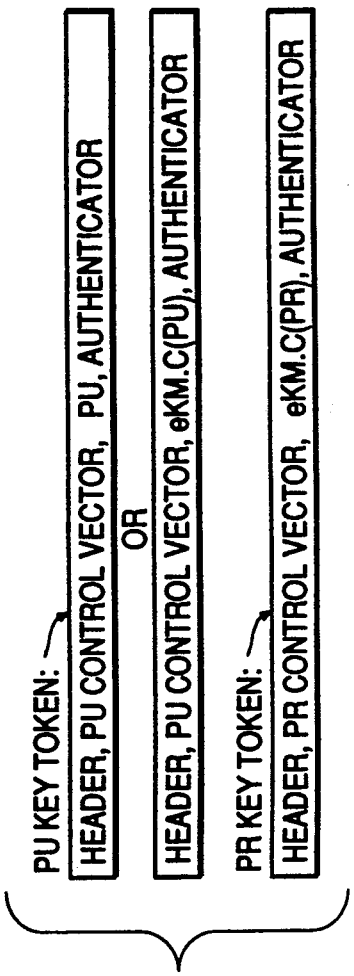
FIG. 15 is a block diagram illustration of PU and PR key tokens.
Figure 16:
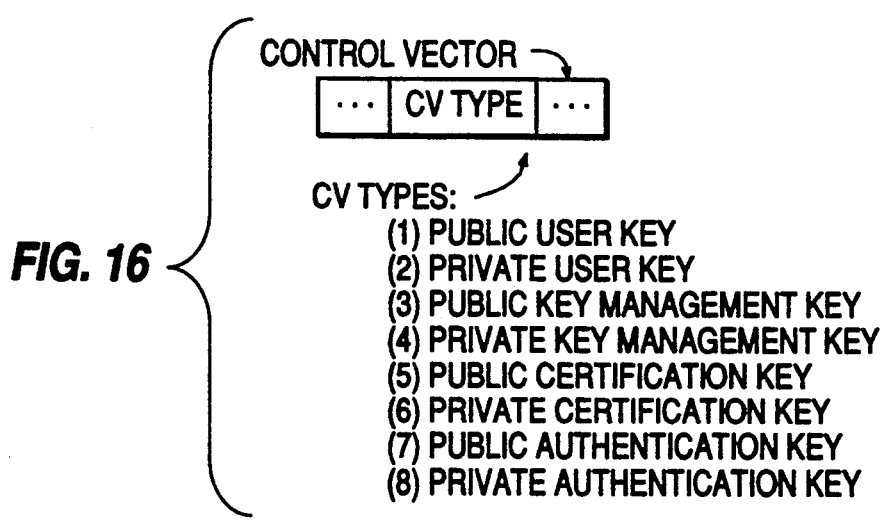
FIG. 16 is a block diagram illustration of the control vector portion of a PU or PR key token.

FIG. 16 gives a further specification of the control vector portion of the PU and PR key tokens. Referring to FIG. 16, the control vector contains a control vector type field, designated CV TYPE, which indicates that the key is a public or private key, and also that the key is a user key, a key management key, a certification key, or an authentication key. The exact definitions for the four key types (user, key management, certification, and authentication) is unimportant to the invention. However, it is important to understand that the different key types have different purposes and uses within the key management design. For example, one can restrict type ='user' such that a private user key can be used only to generate digital signatures. On the other hand, the type ='key management' can be broader to permit a private key management key to be used for the purpose of encrypting and distributing DEA keys from one cryptographic device to another, as well as permitting the private key management key to generate digital signatures. For example, a public and private key management key pair may be used between two cryptographic systems to distribute a DEA key encrypting key. Thereafter, the key encrypting key is used to distributed other DEA keys between the two respective cryptographic systems, such as a data key. In such a case, one would not want a public and private user key pair to be used for such a purpose, since in that case the user himself who knows or can in theory know his own private user key can intercept the encrypted key encrypting key (i.e., the key encrypting key encrypted with PU) and decrypt it with his private key PR. Thus, the user is able to find out the value of the clear key encrypting key, which in most cryptographic systems would defeat the intended security of the key distribution protocol. Hence, at the point at which the GPUPR instruction 52 builds the PU and PR key tokens, it is part of the present invention that the GPUPR instruction shall perform consistency checking on the PU and PR control vectors specified as an input at 50 of FIG. 14 (or equivalently the control data at 50 of FIG. 13) against the mode specified as an input at 50 to ensure that the key types and usage of the generated keys are in conformance with the key management design so intended. For example, if the CFAP specifies mode='PP' and the control data indicates type='key management', then the GPUPR instruction 52 shall detect this inconsistency and abort operation with an indication to the CFAP that processing was halted due to an inconsistent specification for key type. On the other hand, if the CFAP specifies mode='PP' and the control data indicates type='user', then the GPUPR instruction 52 shall not abort operation due to an inconsistency in key type. Note that additional consistency checking, not described here, may cause the GPUPR instruction to abort operation. Since it is important for the generated keys in the key token to be linked with the control information specifying key type and usage, in the preferred embodiment of the invention the PU key token in FIG. 15 shall store PU in the encrypted format, eKM.H1(PU). This is accomplished by making H1 depend on the control vector in the key token, as mentioned above. The exact method for making H1 depend on the control vector is unimportant here, but is described in detail in co-pending patent application by S. M. Matyas, et al. entitled "Public Key Cryptosystem Key Management Using Control Vectors," cited above. From the foregoing, the reader will appreciate that the invention provides a means to generate a public and private key pair from a user supplied passphrase. However, in most cryptographic systems, a more secure design is possible when the public and private keys are generated within the cryptographic system in such a way that the user has no ability to predict or determine the value of the private key PR, as described above. Hence, the invention also provides a means for controlling the usage of both of these types of generated keys, depending on whether the key pair is derived from a passphrase or whether the key pair is not derived from a passphrase. The prior art (U.S. Pat. Nos. 4,941,176, 4,918,728, 4,924,514, 4,924,515, and 5,007,089) described means for controlling key type and key usage via control vectors. But this prior art does not describe a means for limiting the type and uses of a key according to how it is generated. In contrast, the present invention does distinguish between public and private keys generated from a passphrase and keys not generated from a passphrase, and it has been shown that this distinction is important to a key management as a means for deciding within the key generation instruction (i.e., the GPUPR instruction) whether a specified key type should be allowed or not allowed. Thus, the invention provides a means for adequately controlling the generation process so that the generated keys are appropriately cryptographically coupled to control vector information specifying the type of the key and how it may be processed within the cryptographic system. Without such a means to control the generated keys, the advantages of the passphrase and of a key generated from a passphrase would be seen to weaken the overall security of the cryptographic system, and the advantage of keys derived from a passphrase would be seen not as an advantage but as a disadvantage. Hence, the present invention not only provides a means to generate keys from passphrases but is also provides the essential means for controlling the generated keys within the key management.

Figure 14:
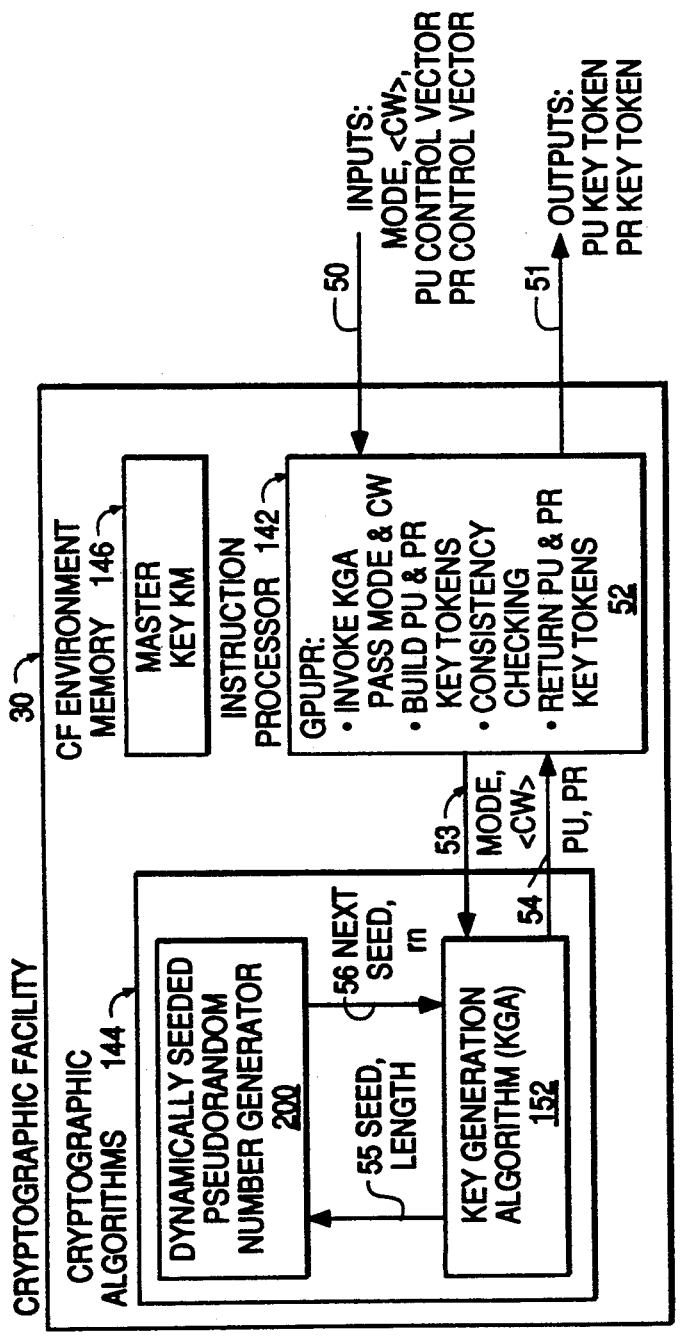
FIG. 14 is a block diagram illustration of the Generate Public and Private Key Pair (GPUPR) instruction, in accordance with the invention.

FIG. 14 is an illustration of the operations performed within the CF 30 as a result of invoking GPUPR instruction 52. GPUPR instruction 52 in FIG. 14 is just the same GPUPR instruction 52 in FIG. 13, except here FIG. 14 shows the additional steps of invoking the key generation algorithm 152 and the dynamically seeded pseudorandom number generator 200. Referring to FIG. 14, the inputs at 50 consist of a mode, an optional code word (designated CW), PU control vector, and PR control vector. In FIG. 13, the PU control vector and the PR control vector are merely called control data. In response to being invoked, the GPUPR instruction 52 invokes key generation algorithm KGA 152 at 53, passing a mode parameter and an optional CW. In response, the KGA 152, carries out the steps for performing key generation. For example, if the cryptographic algorithm implemented within the CF 30 is the RSA algorithm, then the key generation steps are just those illustrated in FIG. 7. The first time the KGA 152 requires a random number, the value of CW is used as the initial seed and the length of the required random number RN is added to the value 128, which is the length of the next seed, to obtain a value for parameter "length." The KGA 152 then invokes dynamically seeded pseudorandom number generator 200 at 55, passing "length" and seed=CW as input parameters. In response, dynamically seeded pseudorandom number generator 200 produces a random number of length equal to "length" from the input seed equal to CW. For example, the algorithm described in FIG. 12 can be used as the dynamically seeded pseudorandom number generator 200. The generated random number RN of length equal to "length" is returned to KGA 152 at 56. FIG. 14 designates the output at 56 as next seed and RN. In reality, the generated random number RN is just the concatenation of next seed (of length 128-bits) and RN (the desired random number of length equal to "length" minus 128 bits). Upon receipt of RN, KGA 152 parses it to obtain next seed and RN. The value of next seed is saved in the event the KGA 152 finds it necessary to make another call to dynamically seeded pseudorandom number generator 200. The value of RN is then used in the key generation process. The next time the KGA 152 requires a random number the value of next seed is retrieved and used as the seed and the length of the required random number run is added to the value 128 to obtain a value for parameter "length." The process continues in this way. If the key generation algorithm generates RSA keys using the method of FIG. 7, then KGA 152 will need to make calls to dynamically seeded pseudorandom number generator 200 when, in FIG. 7, the steps 161, 164, and 170 are entered. The lengths of the needed random numbers RN1, RN2, etc. will depend on the desired length of the modulus, and depends on the particular implementation of the KGA and of the cryptographic system itself. Those skilled in the art will recognize that the invention can be practiced in any and all such environments and implementations of the RSA algorithm, RSA key generation algorithm, and RSA cryptographic systems. Moreover, those familiar with public key algorithms will immediately recognize that key generation with these other algorithms is similar to that of the RSA algorithm in that the steps involved in key generation will require, at certain points and times within the process, random numbers or random values that can be generated with dynamically seeded pseudorandom number generator 200. Thus, those skilled in the art will recognize that the present invention is not limited to only the production of RSA keys but that in general the method for generating public and private keys from a passphrase extends to other public key algorithms as well. After KGA 152 completes the key generation process, i.e., after PU and PR have been generated, PU and PR are returned to GPUPR instruction 52 at 54. In response, GPUPR instruction 52 builds the PU key token and PR key token using PU and PR and the mode and control vectors supplied as inputs at 50. Next, GPUPR instruction 52 performs consistency checking on the mode and the control vectors supplied as inputs at 50, to determine whether the key type and usage is consistent with the method of key generation (i.e., based on a passphrase or not based on a passphrase), as already discussed above. If the consistency checking is successful, the PU key token and PR key token are returned to the CFAP (KEY GENERATE function) at 51. Otherwise, if the consistency checking is unsuccessful, the GPUPR instruction 52 is halted and the PU key token and PR key token are not returned to the CFAP at 51.

Passphrase Selection Process: We have described a method in the subject invention for generating a public and private key pair (PU,PR) from a secret passphrase supplied as input by the user. Since the resultant private key PR is entirely dependent on the value of the entered passphrase, and we assume that the key generation algorithm is public knowledge, it can be inferred that the secrecy of the private key PR is entirely dependent on the secrecy of the passphrase itself. If it were possible for an adversary to obtain or guess the value of someone's passphrase, the adversary could use the known key generation algorithm and passphrase to determine the private key PR. There are two primary classes of measures which must be used to protect the secrecy of the user's passphrase:

measures to prevent disclosure of a selected passphrase to unauthorized parties;

measures to prevent an unauthorized party from simply guessing a selected passphrase.

The first class of measures is usually implemented by a set of rules or guidelines which may be provided to the users. For example, passphrases should be memorized and not written down. If the passphrase must be written down, it should be done so under controlled circumstances to avoid accidental disclosure; furthermore, written copies should be securely stored when not in use. Most of these rules are just common sense, and apply to many "secrets" that users deal with everyday, such as with system passwords, lock combinations, and private phone numbers The second class of measures is often more difficult to quantify in terms of common sense rules. These measures focus on the methods that a person uses to select the passphrase itself. It should be obvious that some passphrases are easier to guess than others. Therefore a systematic method for selecting a 'good' passphrase (i.e., one that cannot be feasibly guessed) and avoiding 'bad' passphrases (i.e., those that can feasibly be guessed) should be provided.

Figure 17:
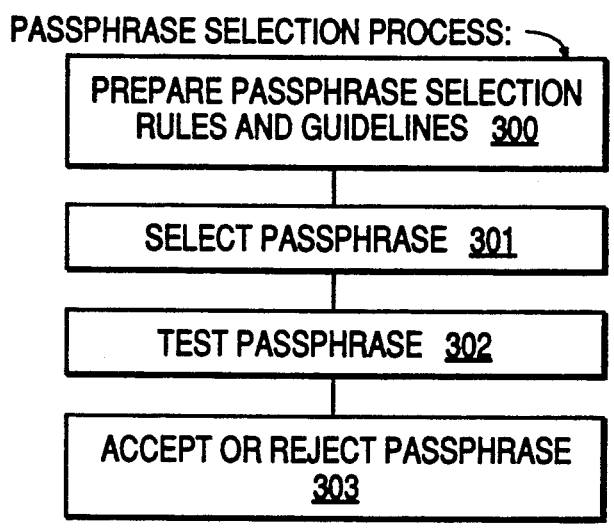
FIG. 17 is a block diagram illustration of the passphrase selection process.

FIG. 17 describes the passphrase selection process. The first step 300, is to prepare and publish a set of passphrase selection rules and guidelines. The passphrase selection guidelines are provided to the user to help the user select a 'good' passphrase. These rules incorporate in written, understandable form a set of criteria which will satisfy a passphrase 'filter', to be described in a later section.

Sample Passphrase Selection Guidelines: In this section, a list of DOs and DON'Ts is provided to guide users in proper passphrase construction. Specific examples are given to illustrate both good and bad choices. None of the examples should be used in practice, since an adversary may have read this document.

Basically the passphrase must be CONSTRUCTED; it must not be selected from a repertoire of phrases that may be guessed by an adversary. Moreover, the passphrase must be constructed so that the NUMBER of words and word usage FREQUENCIES are such that, for practical purposes, an adversary cannot discover the passphrase by using an exhaustive, directed search.

Remember that using a 'bad' passphrase (e.g., your name or phone number) will produce a cryptographic key that has the appearance of being randomly generated, and, in this sense, it provides some protection against the casual intruder. But such a key provides no real cryptographic protection.

Practices to avoid (as use of them in the past has actually led to cryptanalysis of ciphertext) are the following:

1. Do not select a passphrase from a passphrase list (e.g., a book), instead construct it yourself.
2. Do not use a predictable phrase where only a few words of the phrase provide clues to the remainder. For example, do not use:
   a line from a well-known poem or nursery rhyme,
   the name of a well-known person, place or thing
   phrases from national, cultural, ethnic or religious heritage.
3. Do not use a phrase similar in concept to previous passphrases. For example, if last time you used facts about your grandfather, this time do not use facts about your grandmother.
4. Do not use just a single word as the passphrase. An average dictionary has around 10,000 words. The variability of this is less than 2**14 and can be quickly exhausted at electronic speeds.
5. Do not use ONLY the most common English words (i.e. those basic words usually with Anglo-Saxon origins). Doing so could reduce the size of a dictionary of an adversary from over 10,000 words to somewhere around 2,000 words or even less.
6. Do not use sentences one would find in a elementary school reader.

Practices which are valid are the following:

1. A passphrase should be created anew (i.e. it should be original).
2. The passphrase length should be at least 40 to 50 alphabetic characters (A-Z), omitting blanks, which is about 10 words. This is sufficient to thwart an exhaustive computer analysis.
3. Consider increasing the alphabet or dictionary an adversary would need to build by doing one or more of the following:
   including some special characters (for example, depending on your keyboard, ||@#$%>&*( ).+−=!¢:;,.?"'/ |{}<>)
   introducing numbers into the text
   deliberately misspelling a word (e.g., happen3stance)
   using foreign words. This increases the input character set and each character in the passphrase, instead of having the 26 possibilities of a letter, now has the many more possibilities of an alphanumeric character. Of course, mitigating doing this is the fact that the passphrase may be harder to remember.
4. It is okay if a passphrase contains proper names.
5. Try to make the passphrase easily remembered, so that you do not need to write it down. Conversely, the phrase should be impossible for someone else to guess so consider including esoteric information that only you know.

Passphrase Examples: Bad Passphrase Examples:
'Antidisestablismentarianism'—single dictionary word or 'Dick and Jane see Spot run. Jump Spot jump.'—first grade reader
'A bee bit me.'—too short or 'George Washington Carver'—famous person
'Mary had a little lamb, its fleece was white as snow.-'—famous poem
'Thou shalt have no other gods before Me.'—religious heritage
'Four score and seven years ago . . . '—national heritage Good Passphrase Examples:
'I have never lived in Chicago at 278 Lake Shore.'
'Why do you believe that fishies don't float in the sky?'
'Did George Washington read Pascal or talk to an ambassador?'
'My favorite color is green or am I lieing & it's Moorish Mist.'
'Counting "won, too, tree" is childish (but so what)!'
'Cannot I dance on my head? I dunno, perhaps I shall.'

Passphrase Filter: Referring again to FIG. 17, once the user has selected a passphrase in step 301, it is advantageous to evaluate the user's choice against the published selection guidelines to determine whether a good or bad choice has been made. The evaluation process may of course include additional criteria beyond those published with the guidelines and rules 300. The additional criteria may be difficult to describe in terms of rules, but nonetheless valuable in determining the quality of the chosen passphrase. The aggregate evaluation criteria may be automated in such a way as to input a trial passphrase 301, test the trial passphrase 302, and either accept or reject the trial passphrase 303 on the basis of the result of the test 302. The acceptance at 303 may in turn trigger an enabling of the subsequent key generation process. A rejection may trigger an error message and prompt the user to select a different phrase. The passphrase testing 302 may be implemented in the form of a passphrase filter.

The passphrase filter is a routine for rejecting 'bad' user-constructed passphrases, i.e., passphrases that an adversary might potentially discover by using an exhaustive, directed search. At the time a potential passphrase is generated, the passphrase filter is invoked and the passphrase is provided as a parameter input. Using a dictionary of standard English containing the 10,000 most frequently used words, the passphrase filter calculates a lower bound on the number of passphrases that an adversary computer program would ordinarily have to enumerate before re-generating the user's passphrase. This information is reported to the caller, which may then discard, modify, or accept the passphrase.

The passphrase filter will not automatically guarantee that the passphrase is 'good,' but will eliminate most 'bad' passphrases. In this sense, the passphrase filter used in conjunction with the provided rules for passphrase construction will minimize the chance that a 'bad' passphrase is inadvertently used. Hence, overall security will be enhanced.

A passphrase filter is similar in concept to a password filter; it is a routine which rejects "bad" user selected passphrases, or passphrases that an adversary might potentially discover by using an exhaustive directed search.

An example involving passwords illustrates the importance of such a checking procedure. User selected passwords, like user selected passphrases, present a more user-friendly interface for access control. However, it is well known that people have a tendency to "take the easy way out." If six digit passwords chosen by 1,000 people are examined, we are almost assured that the distribution will not be uniform. We will find a disproportionate number of passwords consisting of six repeated digits (000000, 111111, etc.), digits in sequence (123456, 234567, etc.), or digits with obvious patterns to them. Knowing this, an adversary can organize his exhaustive search by searching the most likely candidates first. In many cases, only a few trials are required to find a password. As a countermeasure, users must be told of the potential risks involved in password selection, and installation computing systems must provide users with a set a simple rules to be followed in selecting passwords. Password checking algorithms can also be provided in many computer systems to test and reject weak passwords.

A similar, but more involved set of rules must be followed in passphrase construction. In many cases, the rules are less intuitive, and therefore a system implemented passphrase filter is all the more important. A passphrase filter consists of a set of simple, fast tests applied to a trial passphrase. Each test estimates the variability of the passphrase. The minimum value, after running all tests, is reported back to the user.

Figure 18:
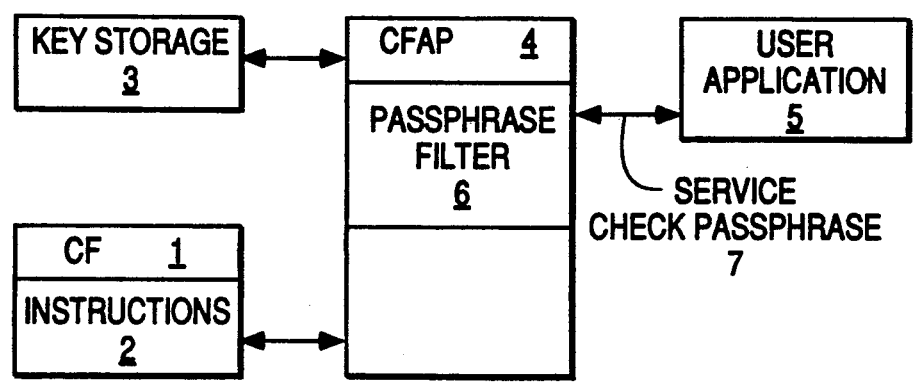
FIG. 18 is a block diagram illustration of a cryptographic system using a passphrase filter to test a trial passphrase supplied by a user application.

FIG. 18 illustrates a cryptographic system consisting of a cryptographic facility 1 capable of executing a set of cryptographic instructions 2, a key storage 3, a cryptographic facility access program 4, and using application programs 5. The cryptographic facility access program 4 contains a passphrase filter utility program 6 accessed via a CFAP service called Check Passphrase 7. The following steps are involved in checking a trial passphrase. An application 5 invokes the Check Passphrase service 7. The trial passphrase is checked and the estimated variability of the passphrase is returned to the invoker. The invoker should establish what is the least variability that will be accepted, e.g., for DEA key generation the variability should be at least $2^{**}56$.

Figure 19:
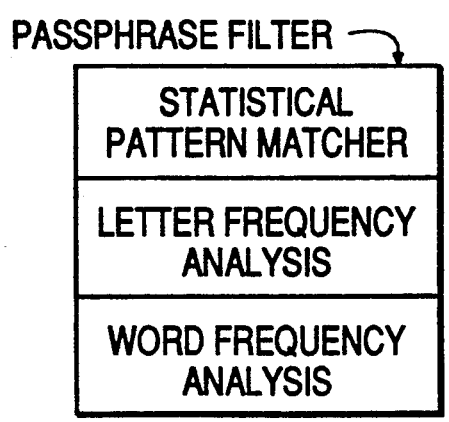
FIG. 19 is a block diagram illustration of the functional elements of a passphrase filter.
Figure 2:
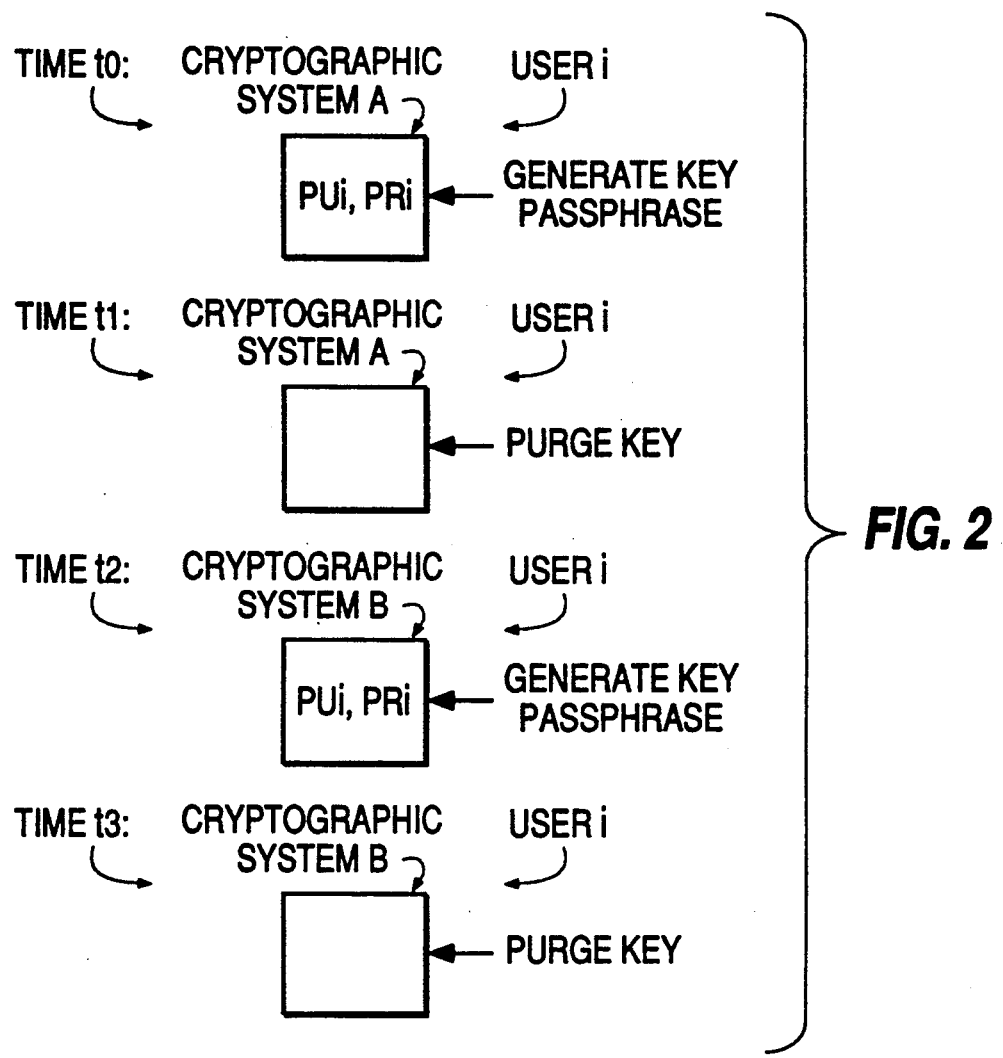
FIG. 2 is a block diagram illustration of public and private key pair generation from a passphrase in cryptographic systems A and B by user i.

FIG. 19 is a flow diagram listing the processing steps in the passphrase filter routine. The passphrase filter provides the following checking:

1. pattern analysis—do characters or sequences of characters repeat?
2. letter frequency analysis—how often do individual letters, digrams, trigrams, etc. typically occur in a language, and specifically in the proposed passphrase?
3. word frequency analysis—how often do specific words occur?

The estimated variability of a passphrase reported to a user by a passphrase filter would be the least of the variability results from each of the above analyses. Methods of implementing these analyses are discussed below.

Pattern Analysis: Standard statistical analysis of the trial passphrase will reveal the following:
1. The total alphabet used in the passphrase.
2. Repetitions of letters or groups of letters.

From this data, calculations of the statistical variability can easily be made. For example, assume the "effective alphabet" is composed of only the characters that appear in the passphrase and define the "effective length" of the passphrase to be the length of the passphrase with all repetitions removed. This will classify passphrases like 'I I I I I I' as "bad".

There is also a natural ordering for numbers and letters. If this natural ordering is used, the passphrase may be able to be guessed by an adversary. One way to detect numerical or alphabetic order is to assign a rank number to each numeral and letter and use the method of the calculus of finite differences. The method is the one used to calculate the degree of a polynomial which passes thru a finite number of specified points. This method is as follows:

1. The numerals zero thru nine are assigned a rank number from 1 to 10 and the letters "A" through "Z" are assigned a rank number from 11 to 36.
2. Generate a list of the rank numbers for the passphrase.
3. Starting from the left, calculate the first order difference by subtracting from each element the element to its immediate right. The last number in the list does not have a difference calculated for it.
4. Calculate the second order difference by doing the same operation on the numbers in the first order difference.

For example, suppose the passphrase is as follows:
Passphrase: 1 2 3 4 5
Rank Number: 02 03 04 05 06
First Order Difference: 01 01 01 01
Second Order Difference: 00 00 00

When an entry in the list of first order differences is a zero, this means that the adjacent rank numbers were the same. When an entry in the list of second order differences is zero, this means that the difference of the first order was the same or that the rank numbers are changing by a constant which means that piece of the passphrase was in a sequence such as "246" or "ABC". For variability calculations, the effective length of the passphrase is reduced by the number of zeros found in the first and second order difference lists (as such zeros indicate either repeats or simple patterns).

This rank number analysis could also be done with the ordering of the numerals and letters on a "qwerty" (or other) keyboard.

Letter Frequency Analysis: The following letter lists are from Gaines (reference 2).

A list of letters in English text in frequency order is:

E T A O N I S R H L D C U P F M W Y B G V K
Q X J Z.

If special characters are included, then the most common character (even more than an 'E') is a blank or space. A list of digrams in English text in frequency order is:

TH HE AN IN ER RE ES ON EA TI AT ST EN
ND OR TO NT ED IS AR ...

A list of trigrams in English text in frequency order is:

THE AND THA ENT ION TIO FOR NDE HAS
NCE EDT TIS OFT STH MEN ...

1. Group individual letters into frequency groups giving each group an estimate of variability. For ease, define the groups so that the group's variability is an integral power of 2.
   a. 2**0 E
   b. 2**1 T
   c. 2**2 A O
   d. 2**3 N I S R
   e. 2**4 H L D C U P F M
   f. 2**5 W Y B G V K Q X J Z
   g. Give each special character, other than a blank, a value of 2**5.
2. Check for repetitious patterns of letters in the passphrase and remove the repeating patterns from the passphrase to be analyzed.
3. Remove all blanks from the passphrase to be analyzed.
4. Sum the exponents of 2 corresponding to each letter (after pattern discards). The sum is the variability for this test.
5. Do the same for digrams and trigrams.

Word Frequency Analysis: The following is from John B. Carroll's "The American Heritage Word Frequency Book," 1971. A list of the 100 most common English words in frequency order is:

THE OF AND A TO IN IS YOU THAT IT HE
FOR WAS ON ARE AS WITH HIS THEY AT BE
THIS FROM I HAVE OR BY ONE HAD NOT BUT
WHAT ALL WERE WHEN WE THERE CAN AN
YOUR WHICH THEIR SAID IF DO WILL EACH
ABOUT HOW UP OUT THEM THEN SHE MANY
SOME SO THESE WOULD OTHER INFO HAS
MORE HER TWO LIKE HIM SEE TIME COULD
NO MAKE THAN FIRST BEEN ITS WHO NOW
PEOPLE MY MADE OVER DID DOWN ONLY
WAY FIND USE MAY WATER LONG LITTLE
VERY AFTER WORDS CALLED JUST WHERE
MOST KNOW

Using a lexicon of standard English containing the 10,000 most frequently used words, the utility program calculates a lower bound on the number of passphrases that an adversary's computer program would have to enumerate before re-generating the user's passphrase.
1. Build a word frequency list as follows:
   a. 2**0 THE
   b. 2**1 OF
   c. 2**2 AND A
   d. 2**3 TO IN IS YOU
   e. 2**4 THAT IT HE FOR WAS ON ARE AS
   f. etc.
Build this list for as long a word frequency list as desired. Assume if a word does not show up in the list, then it has a frequency the same as the lowest frequency word on your list.
2. Check for repetitious words in the passphrase and remove the repeating words from the passphrase to be analyzed.
3. Sum the exponents of 2 corresponding to each word in the passphrase. The sum is the variability for this test.

Although a specific embodiment of the invention has been disclosed, it will be understood by those having skill in the art that changes can be made to the specific embodiment without departing from the spirit and the scope of the invention.

What is claimed is:

1. In a data processing system, a method for managing a public key cryptographic system which includes a public key, private key pair generator, comprising the steps of:
   generating a first public key, private key pair signal in a generating means using a first seed value known to a user, and generating a first control vector signal defining a first use of said first public key, private key pair signal;
   wherein said first seed value is generated from a passphrase;
   generating a second public key, private key pair signal using a second seed value unknown to the user, and generating a second control vector signal defining a second use of said second public key, private key pair signal;
   controlling the use of said first public key, private key pair signal in controlling means using said first control vector signal; and
   controlling the use of said second public key, private key pair signal with said second control vector signal.

2. The method of claim 1, wherein said second seed value is a pseudorandom number.

3. The method of claim 1, which further comprises the steps of:
   generating a first random number using said first seed value and applying said first random number to said first generation step.

4. The method of claim 1, which further comprises:
   generating a second random number using said second seed value in a pseudorandom number generator and applying said second random number to said second generation step.

5. The method of claim 1, wherein said first control vector signal has two components, a first public key control vector portion for controlling the use of said first public key and a first private key control vector portion for controlling the use of said first private key.

6. The method of claim 1, wherein said second control vector signal has two components, a second public key control vector portion for controlling said second public key and a second private key control vector portion for controlling said second private key.

7. The method of claim 1, wherein said first control vector signal controls said first private key to limit its use to the generation of digital signatures; and
   said second control vector signal controls said second private key to limit its use to the generation of digital signatures and to decrypt encrypted keys received as part of a key distribution protocol.

8. The method of claim 7, wherein said first control vector signal limits the use of said first public key to the verification of digital signatures and said second control vector signal limits the use of said second public key to the verification of digital signatures and to the encryption of keys in a key distribution protocol.

9. The method of claim 1, wherein said first control vector signal controls the generation of a digital signature with said first private key and said second control vector signal prohibits the use of said second private key from the generation of digital signatures.

10. In a data processing system, a method for managing a public key cryptographic system including a public key, private key pair generator, comprising the steps of:
generating a first random number using a first seed value derived from a passphrase;
generating a second random number using a second seed value unknown to a user;
generating a first public key, private key pair signal in a generating means using said first random number and generating a first public key control vector signal and a first private key control vector signal for defining a first use of said first public key and of said first private key, respectively;
generating a second public key, private key pair signal using said second random number and generating a second public key control vector signal and a second private key control vector signal for defining a second use of said second public key and of said second private key, respectively;
controlling the use of said first public key and said first private key in controlling means using said first public key control vector signal and said first private key control vector signal, respectively;
controlling the use of said second public key and said second private key using said second public key control vector signal and said second private key control vector signal, respectively.

11. In a data processing system, a method for managing a cryptographic system having a key generator, comprising the steps of:
generating a first random number using a first seed value derived from a passphrase;
generating a second random number using a second seed value unknown to the user;
generating a first key signal in a generating means using said first random number and generating a first control vector signal for controlling the use of said first key signal;
generating a second key signal using said second random number and generating a second control vector signal controlling a second use of said second key signal;
controlling the use of said first key signal in control means with said first control vector signal;
controlling the use of said second key signal with said second control vector signal;
said first use of said first key signal being different from said second use of said second key signal.

12. In a data processing system, a method for managing a public key cryptographic system including a public key, private key pair generator, comprising the steps of:
generating a random number signal in a generation means using a first seed value derived from a passphrase; and
generating and outputting a public key, private key pair signal in said generation means using said random number signal and generating a first control vector signal for said public key and a second control vector signal for said private key, said first control vector signal controlling the use of said public key and said second control vector signal controlling the use of said private key.

13. In a data processing system, a method for managing a public key cryptographic system, including a public key, private key pair generator, comprising the steps of:
generating a random number signal in a generation means using a seed value derived from a passphrase; and
generating and outputting a public key and a private key pair signal in said generation means using said random number signal.

14. In combination, a data processing system and a program for managing a public key cryptographic system which includes a public key, private key pair generator, said program being executed on said data processing system, said combination performing a method comprising the steps of:
generating a first public key, private key pair signal in a generating means using a first seed value known to a user, and generating a first control vector signal defining a first use of said first public key, private key pair signal;
wherein said first seed value is generated from a passphrase;
generating a second public key, private key pair signal using a second seed value unknown to the user, and generating a second control vector signal defining a second use of said second public key, private key pair signal;
outputting first output signals for controlling the use of said first public key, private key pair signal in a controlling means using said first control vector signal; and
outputting second output signals for controlling the use of said second public key, private key pair signal with said second control vector signal.

15. The combination of claim 14, wherein said second seed value is a pseudorandom number.

16. The combination of claim 14, which further comprises, when executed on said data processing system, performing the steps of:
generating a first random number using said first seed value and applying said first random number to said first generation step.

17. The combination of claim 14, which further comprises, when executed on said data processing system, performing the steps of:
generating a second random number using said second seed value in a pseudorandom number generator and applying said second random number to said second generation step.

18. The combination of claim 14, wherein said first control vector signal has two components, a first public key control vector portion for controlling the use of said first public key and a first private key control vector portion for controlling the use of said first private key.

19. The combination of claim 14, wherein said second control vector signal has two components, a second public key control vector portion for controlling said second public key and a second private key control vector portion for controlling said second private key.

20. The combination of claim 14, wherein said first control vector signal controls said first private key to limit its use to the generation of digital signatures; and said second control vector signal controls said second private key to limit its use to the generation of digital signatures and to decrypt encrypted keys received as part of a key distribution protocol.

21. The combination of claim 20, wherein said first control vector signal limits the use of said first public key to the verification of digital signatures and said second control vector signal limits the use of said second public key to the verification of digital signatures and to the encryption of keys in a key distribution protocol.

22. The combination of claim 14, wherein said first control vector signal controls the generation of a digital signature with said first private key and said second control vector signal prohibits the use of said second private key from the generation of digital signatures.

23. In combination, a data processing system and a program for managing a public key cryptographic system including a public key, private key pair generator, said program being executed on said data processing system, said combination performing a method comprising the steps of:
    generating a first random number using a first seed value derived from a passphrase;
    generating a second random number using a second seed value unknown to a user;
    generating a first public key, private key pair signal in a generating means using said first random number and generating a first public key control vector signal and a first private key control vector signal for defining a first use of said first public key and of said first private key, respectively;
    generating a second public key, private key pair signal using said second random number and generating a second public key control vector signal and a second private key control vector signal for defining a second use of said second public key and of said second private key, respectively;
    outputting first output signals for controlling the use of said first public key and said first private key in controlling means using said first public key control vector signal and said first private key control vector signal, respectively;
    outputting second output signals for controlling the use of said second public key and said second private key using said second public key control vector signal and said second private key control vector signal, respectively.

24. In combination, a data processing system and a program for managing a cryptographic system having a key generator, said program being executed on said data processing system, said combination performing a method comprising the steps of:
    generating a first random number using a first seed value derived from a passphrase;
    generating a second random number using a second seed value unknown to the user;
    generating a first key signal in a generating means using said first random number and generating a first control vector signal for controlling the use of said first key signal;
    generating a second key signal using said second random number and generating a second control vector signal controlling a second use of said second key signal;
    outputting first signals for controlling the use of said first key signal in control means with said first control vector signal;
    outputting second signals for controlling the use of said second key signal with said second control vector signal;
    said first use of said first key signal being different from said second use of said second key signal.

25. In combination, a data processing system and a program for managing a public key cryptographic system including a public key, private key pair generator, said program being executed on said data processing system, said combination performing a method comprising the steps of:
    generating a random number signal in a generation means using a first seed value derived from a passphrase; and
    generating and outputting a public key, private key pair signal in said generating means using said random number and generating a first control vector signal for said public key and a second control vector signal for said private key;
    and outputting said first control vector signal for controlling the use of said public key and said second control vector signal for controlling the use of said private key.

26. In combination, a data processing system and a program for managing a public key cryptographic system, including a public key, private key pair generator, said program being executed on said data processing system, said combination performing a method comprising the steps of:
    generating a random number signal in a generation means using a seed value derived from a passphrase; and
    generating and outputting a public key and a private key pair signal in said generation means using said random number signal.

27. In a data processing system, an apparatus for managing a public key cryptographic system which includes a public key, private key pair generator, comprising:
    first generating means for generating a first public key, private key pair signal using a first seed value known to a user, and generating a first control vector signal defining a first use of said first public key, private key pair signal;
    wherein said first seed value is generated from a passphrase;
    second generating means for generating a second public key, private key pair signal using a second seed value unknown to the user, and generating a second control vector signal defining a second use of said second public key, private key pair signal;
    controlling means coupled to said first generating means, for controlling the use of said first public key, private key pair signal using said first control vector signal; and
    said controlling means coupled to said second generating means, for controlling the use of said second public key, private key pair signal with said second control vector signal.

28. The apparatus of claim 27, wherein said second seed value is a pseudorandom number.

29. The apparatus of claim 27, which further comprises:
    said first generating means generating a first random number using said first seed value and applying said first random number to said generation of a first public key, private key pair signal.

30. The apparatus of claim 27, which further comprises:
said second generating means generating a second random number using said second seed value in a pseudorandom number generator and applying said second random number to said generation of a second public key, private key pair signal.

31. The apparatus of claim 27, wherein said first control vector signal has two components, a first public key control vector portion for controlling the use of said first public key and a first private key control vector portion for controlling the use of said first private key.

32. The apparatus of claim 27, wherein said second control vector signal has two components, a second public key control vector portion for controlling said second public key and a second private key control vector for portion controlling said second private key.

33. The apparatus of claim 27, wherein said first control vector signal controls said first private key to limit its use to the generation of digital signatures; and
said second control vector signal controls said second private key to limit its use to the generation of digital signatures and to decrypt encrypted keys received as part of a key distribution protocol.

34. The apparatus of claim 33, wherein said first control vector signal limits the use of said first public key to the verification of digital signatures and said second control vector signal limits the use of said second public key to the verification of digital signatures and to the encryption of keys in a key distribution protocol.

35. The apparatus of claim 27, wherein said first control vector signal controls the generation of a digital signature with said first private key and said second control vector signal prohibits the use of said second private key from the generation of digital signatures.

36. In a data processing system, an apparatus for managing a public key cryptographic system including a public key, private key pair generator, comprising:
first generating means for generating a first random number using a first seed value derived from a passphrase;
second generating means for generating a second random number using a second seed value unknown to a user;
said first generating means generating a first public key, private key pair signal using said first random number and generating a first public key control vector signal and a first private key control vector signal for defining a first use of said first public key and of said first private key, respectively;
said second generating means generating a second public key, private key pair signal using said second random number and generating a second public key control vector signal and a second private key control vector signal for defining a second use of said second public key and of said second private key, respectively;
controlling means coupled to said first generating means, for controlling the use of said first public key and said first private key using said first public key control vector signal and said first private key control vector signal, respectively;
said controlling means coupled to said second generating means, for controlling the use of said second public key and said second private key using said second public key control vector signal and said second private key control vector signal, respectively.

37. In a data processing system, an apparatus for managing a cryptographic system having a key generator, comprising;
first generating means for generating a first random number using a first seed value derived from a passphrase;
second generating means for generating a second random number using a second seed value unknown to the user;
said first generating means generating a first key signal using said first random number and generating a first control vector signal for controlling the use of said first key signal;
said second generating means generating a second key signal using said second random number and generating a second control vector signal controlling a second use of said second key signal;
controlling means coupled to said first generating means, for controlling the use of said first key signal with said first control vector signal;
said controlling means coupled to said second generating means, for controlling the use of said second key signal with said second control vector signal;
said first use of said first key signal being different from said second use of said second key signal.

38. In a data processing system, an apparatus for managing a public key cryptographic system including a public key, private key pair generator, comprising:
a generating means for generating a random number signal using a first seed value derived from a passphrase;
said generating means generating a public key, private key pair signal using said random number signal and generating a first control vector signal for said public key and a second control vector signal for said private key, said first control vector signal controlling the use of said public key and said second control vector signal controlling the use of said private key.

39. In a data processing system, an apparatus for managing a public key cryptographic system, including a public key, private key pair generator, comprising:
generating means for generating a random number signal using a seed value derived from a passphrase; and
said generating means generating and outputting a public key and a private key pair signal using said random number signal.

* * * * *

UNITED STATES PATENT AND TRADEMARK OFFICE
CERTIFICATE OF CORRECTION

PATENT NO. :   5,201,000
DATED       :   Apr. 6, 1993
INVENTOR(S) :   Stephen M. Matyas, et al.

It is certified that error appears in the above-identified patent and that said Letters Patent is hereby corrected as shown below:

On title page, item [75] Inventors:

add inventor's name --William C. Martin--.

Signed and Sealed this

Sixteenth Day of August, 1994

Attest:

BRUCE LEHMAN

Attesting Officer

Commissioner of Patents and Trademarks